United States Patent
Ogasawara et al.

(10) Patent No.: US 6,801,491 B1
(45) Date of Patent: Oct. 5, 2004

(54) FOCUS ERROR DETECTING APPARATUS OF OPTICAL PICKUP WITH A LIGHT SEPARATING AND ASTIGMATISM GENERATION OPTICAL ELEMENT AND DETECTION METHOD THEREOF

(75) Inventors: Masakazu Ogasawara, Tsurugashima (JP); Takuma Yanagisawa, Tsurugashima (JP); Sakashi Ohtaki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/511,547

(22) Filed: Feb. 23, 2000

(30) Foreign Application Priority Data

Feb. 24, 1999 (JP) .......................................... 11-045784
Mar. 8, 1999 (JP) .......................................... 11-059537
Mar. 24, 1999 (JP) .......................................... 11-078807

(51) Int. Cl.$^7$ .................................................. G11B 7/00
(52) U.S. Cl. ................................ 369/112.26; 369/44.23; 369/44.42; 369/53.23; 369/110.03; 369/110.04
(58) Field of Search ............................... 369/44.42, 120, 369/44.21–44.23, 53.13, 53.23, 110.03, 110.04, 112.26

(56) References Cited

U.S. PATENT DOCUMENTS

| | | | | |
|---|---|---|---|---|
| 4,414,658 A | * | 11/1983 | Yoshida ........................ | 369/44 |
| 4,924,455 A | * | 5/1990 | Fujiie et al. ............... | 369/44.21 |
| 5,084,850 A | * | 1/1992 | Yanagawa et al. ........ | 369/44.41 |
| 5,351,309 A | * | 9/1994 | Lee et al. ...................... | 382/22 |
| 5,406,543 A | * | 4/1995 | Kobayashi et al. .......... | 369/121 |
| 5,508,992 A | * | 4/1996 | Hirose et al. ................ | 369/109 |
| 5,586,095 A | * | 12/1996 | Ichiura et al. ............. | 369/44.24 |
| 5,612,937 A | * | 3/1997 | Maeda ..................... | 369/44.42 |
| 5,717,201 A | * | 2/1998 | Lin et al. ..................... | 250/214 |
| 6,125,087 A | * | 9/2000 | Ohnishi et al. .......... | 369/44.23 |

* cited by examiner

Primary Examiner—Gautam R. Patel
(74) Attorney, Agent, or Firm—Perman & Green, LLP

(57) ABSTRACT

A focus error detecting apparatus and a focus error detecting method of an optical pickup in which the system is not easily influenced by track transversal noises and an optical disc thickness error and which can be used together with a 3-beam system or a DPD system. The return light from an optical disc is divided to a first optical path and a second optical path by a hologram device, a predetermined astigmatism is applied to the light on each divided optical path, the light is received and detected by a first detector and a second detector, and a focusing error signal is obtained by predetermined arithmetic operations. The return light from the optical disc is divided to the first optical path P1 and the second optical path P2 by a lens device constructed by combining eccentric cylindrical lenses, a predetermined astigmatism is applied to the light on each divided optical path, the light is received and detected by a first detector and a second detector each having photosensing portions divided into four portions by dividing lines having a lightning shape, and a focusing error signal is obtained by predetermined arithmetic operations.

6 Claims, 20 Drawing Sheets

FOCUS ERROR DETECTING APPARATUS OF OPTICAL PICKUP WITH A LIGHT SEPARATING AND ASTIGMATISM GENERATION OPTICAL ELEMENT AND DETECTION METHOD THEREOF

BACKGROUND OF THE INVENTION

1. Field of the Invention

The invention relates to a focus error detecting apparatus of an optical pickup for detecting a focus error of light in the optical pickup for writing information to an optical disc by emission light from a light source or reading the information from the optical disc by return light from the optical disc and also relates to a focus error detecting method of the optical pickup.

2. Description of Related Art

An optical pickup having a light source, an optical system, and a photodetecting system is used widely. The operation of such a pickup is to irradiate emission light emitted from the light source onto an information recording surface of the surface of an optical disc such as CD (Compact Disc), CD-ROM, DVD (Digital Versatile Disc), or the like to write recording information such as music, data, or the like on the optical disk, or reading the recording information of the optical disk from the return light reflected and returned by the information recording surface of the optical disc.

With the optical pickup, in order to write the information surely onto the optical disc or to read the information surely from the optical disc, it is necessary to perform a control operation so as to always irradiate the emission light onto a recording position (for example, track) of the information recording surface of the optical disc (hereinafter, this control is referred to as a "tracking servo control") and control so as to converge the emission light as a spot-like point to the recording position (hereinafter, this control is referred to as a "focusing servo control").

As a method of the focusing servo control, for example, an "astigmatism method" and a "spot size method" are known.

The astigmatism method is a method wherein a cylindrical lens, a parallel flat plate, or the like is arranged in the optical system and the return light is received and detected by a 4-split detector.

With this construction, in the case where the emission light is focused onto the information recording surface of the optical disc (hereinafter, this state is referred to as "focused"), the return light is received like a circle to the center of the 4-split detector and a photosensing intensity of each photosensing surface of the 4-split detector is balanced. When the emission light is not focused on the optical disc, however, the return light becomes an elliptic shape which is inclined on the 4-split detector and the photosensing intensity of each photosensing surface of the 4-split detector is unbalanced. From this principle, in-focus or out-of-focus of the emission light on the optical disc can be detected by a signal obtained by performing a predetermined arithmetic operation to a photodetection electric signal obtained by photoelectrically converting the received light by each photosensing surface (hereinafter, this signal is referred to as a "focusing error signal"). A focusing servo control can be performed by controlling an objective lens or the like of a light transmission and reception optical system so as to feed back the focusing error signal.

The astigmatism method has a high detecting sensitivity of out-of-focus. Since the 4-split detector is used for photodetection, a tracking error signal for tracking servo control by a DPD (Differential Phase Detection) system can be easily obtained by arithmetic operations. The astigmatism method has an advantage that it can be easily applied also to an optical pickup of a 3-beam system using three light spots since the whole optical pickup can be miniaturized.

The spot size method is a method whereby the return light is divided into two optical paths by a photodetecting system and a focal point focused to a forward detector (hereinafter, this focal point is referred to as a "front focal point") and a focal point focused to a rear detector (hereinafter, this focal point is referred to as a "rear focal point") are caused.

With this construction, sizes of the return light spots of the front detector and the rear detector are equal in an in-focus state where the emission light is focused on the optical disc. If the emission light is in an out-of-focus state on the optical disc, however, the sizes of the return light spots of the front detector and the rear detector differ and the photosensing intensities of the detectors are unbalanced. The in-focus or out-of-focus of the emission light on the optical disc can be detected consequently by the focusing error signal obtained by performing a predetermined arithmetic operation to the photodetection electric signal obtained by photoelectrically converting the received light by each detector. A focusing servo control can be performed by controlling the objective lens or the like of the light transmission and reception optical system so as to feed back the focusing error signal.

In the spot size method, the focusing error signal is calculated by a difference between the photodetection electric signal from the front detector and the photodetection electric signal from the rear detector. When the emission light spot transverses the tracks on the optical disc, therefore, noises which are applied to the focusing error signal (hereinafter, referred to as "track transversal noises") are set off by obtaining the difference between the pliotodetection electric signals of the two detectors, so that there is an advantage such that the signal is not influenced by the track transversal noises.

The conventional focus error detecting methods of the optical pickup, however, have the following problems.

1) According to the astigmatism method, when the optical pickup has an aberration (for example, astigmatism or the like), the signal is influenced by the track transversal noises. In the astigmatism method, when a thickness of optical disc is not constant but there is a thickness error depending on the position, a shape of return light spot on the detector is deformed, the light which cannot inherently be received leaks or enters the other photosensing surface, and an error occurs in the DPD tracking error signal.

2) According to the spot size method, in order to separate the return light to a plurality of optical paths, the optical pickup increases in size. It is difficult to use this method together with the 3-beam system because a structure becomes complicated.

OBJECTS AND SUMMARY OF THE INVENTION

The invention has been made to solve the problems and it is an object of the invention to provide a focus error detecting apparatus of an optical pickup and a focus error detecting method of an optical pickup, in which a signal is hard to be influenced by track transversal noises and an optical disc thickness error and the invention can be used together with the 3-beam system or DPD system.

To accomplish the object, according to the first aspect of the invention, there is provided a focus error detecting apparatus of an optical pickup, for detecting a focus error of an emission light in the optical pickup for writing optical disc recording information onto an information recording surface of an optical disc by the emission light emitted from a light source or reading out the optical disc recording information from return light which is emitted from the light source and reflected and returned by the information recording surface of the optical disc, comprising: a focus error detecting optical device having optical path separating means for separating the light existing in a first quadrant region and a third quadrant region on a plane that is perpendicular to an optical axis of the return light to a first optical path and separating the light existing in a second quadrant region and a fourth quadrant region on the plane that is perpendicular to the optical axis to a second optical path, first optical processing means for applying a first astigmatism to the light on the first optical path to thereby obtain first processing light, and second optical processing means for applying a second astigmatism in the direction that is inclined by 90° for the first astigmatism to the light on the second optical path to thereby obtain second processing light; a first photodetector having four-split first photosensing portions and for receiving and detecting the first processing light; a second photodetector having four-split second photosensing portions and for receiving and detecting the second processing light; and focus error discrimination value operating means for performing predetermined arithmetic operations to an intensity of each light received by the four portions of the first photosensing portions and an intensity of each light received by the four portions of the second photosensing portions and generating a focus error discrimination value.

According to the second aspect of the invention, in the focus error detecting apparatus of the optical pickup according to the first aspect of the invention, the optical path separating means is a first hologram portion having a prism function, the first optical processing means is a second hologram portion having a cylindrical lens function in which the first direction is set to a major axis, and the second optical processing means is a second hologram portion having a cylindrical lens function in which the direction that is inclined by 90° for the first direction is set to a major axis.

According to the third aspect of the invention, in the focus error detecting apparatus of the optical pickup according to the first aspect of the invention, the focus error detecting optical device is constructed by having: an eccentric cylindrical lens which is arranged in each of the first quadrant region and the third quadrant region on the plane that is perpendicular to the optical axis and sets the first direction to a major axis; and an eccentric cylindrical lens which is arranged in each of the second quadrant region and the fourth quadrant region on the plane that is perpendicular to the optical axis and sets the direction that is inclined by 90° for the first direction to a major axis.

According to the fourth aspect of the invention, in the focus error detecting apparatus of the optical pickup according to the first aspect of the invention, a third photodetector for a + primary subbeam and a fourth photodetector for a − primary subbeam are provided on the sides of the first photodetector and the second photodetector and a control by the 3-beam system is performed.

According to the fifth aspect of the invention, in the focus error detecting apparatus of the optical pickup according to the first aspect of the invention, the control by the DPD system is performed.

According to the sixth aspect of the invention, there is provided a focus error detecting method of an optical pickup, for detecting a focus error of an emission light in the optical pickup for writing optical disc recording information onto an information recording surface of an optical disc by the emission light emitted from a light source or reading out the optical disc recording information from return light which is emitted from the light source and reflected and returned by the information recording surface of the optical disc, comprising the steps of: providing a focus error detecting optical device having optical path separating means for separating the light existing in a first quadrant region and a third quadrant region on a plane that is perpendicular to an optical axis of the return light to a first optical path and separating the light existing in a second quadrant region and a fourth quadrant region on the plane that is perpendicular to the optical axis to a second optical path, first optical processing means for applying a first astigmatism to the light on the first optical path to thereby obtain first processing light, and second optical processing means for applying a second astigmatism in the direction that is inclined by 90° for the first astigmatism to the light on the second optical path to thereby obtain second processing light, a first photodetector having four-split first photosensing portions and for receiving and detecting the first processing light, and a second photodetector having four-split second photosensing portions and for receiving and detecting the second processing light; and performing predetermined arithmetic operations to an intensity of each light received by the four portions of the first photosensing portions and an intensity of each light received by the four portions of the second photosensing portions and generating a focus error discrimination value.

To accomplish the object, according to the seventh aspect of the invention, there is provided a focus error detecting apparatus of an optical pickup, for detecting a focus error of an emission light in the optical pickup for writing optical disc recording information onto an information recording surface of an optical disc by the emission light emitted from a light source or reading out the optical disc recording information from return light which is emitted from the light source and reflected and returned by the information recording surface of the optical disc, comprising: a focus error detecting optical device for separating the light existing in a first quadrant region and a third quadrant region on a plane that is perpendicular to an optical axis of the return light to a first optical path, separating the light existing in a second quadrant region and a fourth quadrant region on the plane that is perpendicular to the optical axis to a second optical path, applying a first astigmatism to the light on the first optical path to thereby obtain first processing light, and applying a second astigmatism in the direction that is inclined by 90° for the first astigmatism to the light on the second optical path to thereby obtain second processing light; a first photodetector having four trapezoidal first photosensing portions formed by dividing a photosensing area into four portions by lightning-shaped dividing lines and for receiving and detecting the first processing light; a second photodetector having other four trapezoidal second photosensing portions formed by dividing a photosensing area into four portions by other lightning-shaped dividing lines and for receiving and detecting the second processing light; and focus error discrimination value operating means for performing predetermined arithmetic operations to an intensity of each light received by the four portions of the first photosensing portions and an intensity of each light received by the four portions of the second photosensing portions and generating a focus error discrimination value.

According to the eighth aspect of the invention, in the focus error detecting apparatus of the optical pickup according to the seventh aspect of the invention, the focus error detecting optical device is constructed by having: an eccentric cylindrical lens which is arranged in each of the first quadrant region and the third quadrant region on the plane that is perpendicular to the optical axis and sets the first direction to a major axis; and an eccentric cylindrical lens which is arranged in each of the second quadrant region and the fourth quadrant region on the plane that is perpendicular to the optical axis and sets the direction that is inclined by 90° for the first direction to a major axis.

According to the ninth aspect of the invention, in the focus error detecting apparatus of the optical pickup according to the seventh aspect of the invention, the photosensing area of the first photodetector is formed in a first square shape that is inclined by 45° and divided by a first uniform dividing line that is parallel with one side of the first square and equally divides the first square into two rectangles and two parallel lines having a first dividing angle for the first uniform dividing line, and the photosensing area of the second photodetector is formed in a second square shape that is inclined by 45° and arranged so as to use one side in common with the first square and divided by a second uniform dividing line that is perpendicular to the first uniform dividing line and equally divides the second square into two rectangles and two parallel lines having a second dividing angle for the second uniform dividing line.

According to the tenth aspect of the invention, in the focus error detecting apparatus of the optical pickup according to the seventh aspect of the invention, a third photodetector for a + primary subbeam and a fourth photodetector for a − primary subbeam are provided on the sides of the first photodetector and the second photodetector and a control by the 3-beam system is performed.

According to the eleventh aspect of the invention, in the focus error detecting apparatus of the optical pickup according to the seventh aspect of the invention, the control by the DPD system is performed.

According to the twelfth aspect of the invention, there is provided a focus error detecting method of an optical pickup, for detecting a focus error of an emission light in the optical pickup for writing optical disc recording information onto an information recording surface of an optical disc by the emission light emitted from a light source or reading out the optical disc recording information from return light which is emitted from the light source and reflected and returned by the information recording surface of the optical disc, comprising the steps of: providing a focus error detecting optical device for separating the light existing in a first quadrant region and a third quadrant region on a plane that is perpendicular to an optical axis of the return light to a first optical path, separating the light existing in a second quadrant region and a fourth quadrant region on the plane that is perpendicular to the optical axis to a second optical path, applying a first astigmatism to the light on the first optical path to thereby obtain first processing light, and applying a second astigmatism in the direction that is inclined by 90° for the first astigmatism to the light on the second optical path to thereby obtain second processing light, a first photodetector having four trapezoidal first photosensing portions formed by dividing a photosensing area into four portions by lightning-shaped dividing lines and for receiving and detecting the first processing light, and a second photodetector having other four trapezoidal second photosensing portions formed by dividing a photosensing area into four portions by other lightning-shaped dividing lines and for receiving and detecting the second processing light; and performing predetermined arithmetic operations to an intensity of each light received by the four portions of the first photosensing portions and an intensity of each light received by the four portions of the second photosensing portions and generating a focus error discrimination value.

To accomplish the object, according to the thirteenth aspect of the invention, there is provided a focus error detecting apparatus of an optical pickup, for detecting a focus error of an emission light in the optical pickup for writing optical disc recording information onto an information recording surface of an optical disc by the emission light emitted from a light source or reading out the optical disc recording information from return light which is emitted from the light source and reflected and returned by the information recording surface of the optical disc, comprising: a focus error detecting optical device having optical path separating means for separating the light existing in a first quadrant region and a third quadrant region on a plane that is perpendicular to an optical axis of the return light to a first optical path and separating the light existing in a second quadrant region and a fourth quadrant region on the plane that is perpendicular to the optical axis to a second optical path, first optical processing means for applying a first astigmatism to the light on the first optical path to thereby obtain first processing light and applying a second astigmatism in the direction that is inclined by 90° for the first astigmatism to the light on the second optical path to thereby obtain second processing light, and second optical processing means for applying a first focal point to the first processing light to thereby obtain third processing light and applying a second focal point to the second processing light to thereby obtain fourth processing light; a first photodetector having four rectangular first photosensing portions formed by dividing a photosensing area into four portions by parallel dividing lines and for receiving and detecting the third processing light; a second photodetector having four rectangular second photosensing portions formed by dividing a photosensing area into four portions by parallel dividing lines and for receiving and detecting the fourth processing light; and focus error discrimination value operating means for performing predetermined arithmetic operations to an intensity of each light received by the four portions of the first photosensing portions and an intensity of each light received by the four portions of the second photosensing portions and generating a focus error discrimination value.

According to the fourteenth aspect of the invention, in the focus error detecting apparatus of the optical pickup according to the thirteenth aspect of the invention, the optical path separating means is a first hologram portion having a prism function, the first optical processing means is a second hologram portion having a cylindrical lens function in which the first direction is set to a major axis for the light on the first optical path and having a cylindrical lens function in which the direction that is inclined by 90° for the first direction is set to a major axis for the light on the second optical path, and the second optical processing means is a third hologram portion having a convex lens function for the first processing light and having a convex lens function for the second processing light, and a focal distance of the convex lens for the first processing light and that of the convex lens for the second processing light differ.

According to the fifteenth aspect of the invention, in the focus error detecting apparatus of the optical pickup according to the thirteenth aspect of the invention, a third photodetector for a + primary subbeam and a fourth photodetector for a − primary subbeam are provided on the sides of the first photodetector and the second photodetector and a control by the 3-beam system is performed.

According to the sixteenth aspect of the invention, in the focus error detecting apparatus of the optical pickup according to the thirteenth aspect of the invention, the control by the DPD system is performed.

According to the seventeenth aspect of the invention, there is provided a focus error detecting method of an optical pickup, for detecting a focus error of an emission light in the optical pickup for writing optical disc recording information onto an information recording surface of an optical disc by the emission light emitted from a light source or reading out the optical disc recording information from return light which is emitted from the light source and is reflected and returned by the information recording surface of the optical disc, comprising the steps of: providing a focus error detecting optical device having optical path separating means for separating the light existing in a first quadrant region and a third quadrant region on a plane that is perpendicular to an optical axis of the return light to a first optical path and separating the light existing in a second quadrant region and a fourth quadrant region on the plane that is perpendicular to the optical axis to a second optical path, first optical processing means for applying a first astigmatism to the light on the first optical path to thereby obtain first processing light and applying a second astigmatism in the direction that is inclined by 90° for the first astigmatism to the light on the second optical path to thereby obtain second processing light, and second optical processing means for applying a first focal point to the first processing light to thereby obtain third processing light and applying a second focal point to the second processing light to thereby obtain fourth processing light, a first photodetector having four rectangular first photosensing portions formed by dividing a photosensing area into four portions by parallel dividing lines and for receiving and detecting the third processing light, and a second photodetector having four rectangular second photosensing portions formed by dividing a photosensing area into four portions by parallel lines and for receiving and detecting the fourth processing light; and performing predetermined arithmetic operations to an intensity of each light received by the four portions of the first photosensing portions and an intensity of each light received by the four portions of the second photosensing portions and generating a focus error discrimination value.

DETAILED DESCRIPTION OF THE PREFERRED EMBODIMENTS

An embodiment of a focus error detecting apparatus of an optical pickup according to the invention will now be described hereinbelow with reference to the drawings.

(1) First Embodiment

Figure 1A:
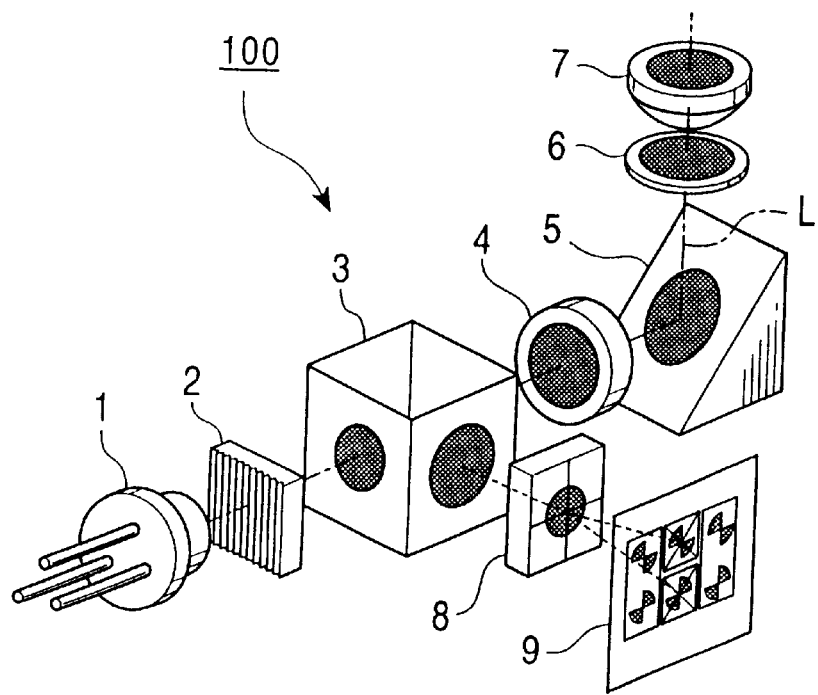
FIGS. 1A and 1B are diagrams showing a construction of an optical pickup according to the first embodiment of the invention.
Figure 1B:
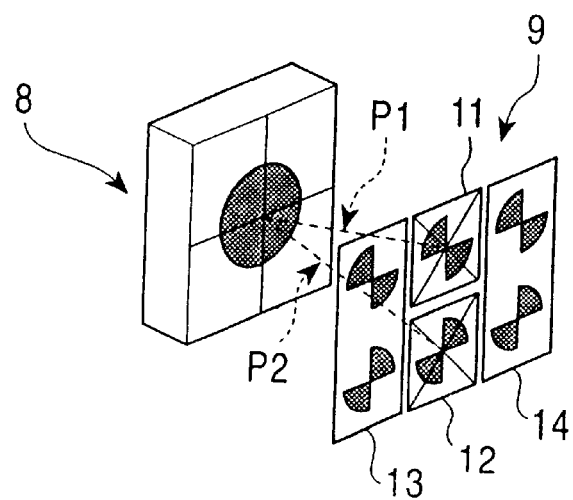

FIGS. 1A and 1B are diagrams showing a construction of an optical pickup according to the first embodiment of the invention. As shown in FIG. 1A, an optical pickup 100 comprises: a semiconductor laser 1 as a light source; a grating 2; a beam splitter 3; a collimator lens 4; a mirror 5; a ¼ wavelength plate 6; an objective lens 7; a hologram device 8; and a photodetecting portion 9. An objective lens driving mechanism (not shown) which can move the objective lens 7 forward and backward in the optical axial direction is provided for the objective lens 7. 0As shown in FIG. 1B, the photodetecting portion 9 has a first detector 11, a second detector 12, a third detector 13, and a fourth detector 14. An arithmetic operating circuit (not shown) comprising an adder and a subtractor for performing predetermined arithmetic operations on the basis of a photodetection electric signal generated from each detector is connected to the first detector 11 and second detector 12.

A laser beam L emitted from the semiconductor laser 1 enters the beam splitter 3 through the grating 2. The beam splitter 3 has a half mirror (semi-transparent mirror). The incident laser beam L passes through the beam splitter 3 and is transmitted through the collimator lens 4. An optical path of the laser beam is turned by a right angle by the mirror 5 and, thereafter, the laser beam passes through the ¼ wavelength plate 6 and is irradiated from the objective lens 7 onto the information recording surface of an optical disc (not shown) locating at an upper position in the diagram. Optical disc recording information can be written to the information recording surface of the optical disc by the irradiation light.

The laser beam L is reflected by the information recording surface of the optical disc, returned along the same optical path, transmitted through the objective lens 7, ¼ wavelength plate 6, mirror 5, and collimator lens 4, and enters the beam splitter 3 again. In this case, the optical path of the return light is changed in the direction different from the direction toward the semiconductor laser 1 by the beam splitter 3. After that, the laser beam passes through the hologram device 8 and enters the photodetecting portion 9. The photodetecting portion 9 photoelectrically converts the received light and generates a photodetection electric signal. The optical disc recording information can be read out from the photodetection electric signal.

A focus error detecting method in the optical pickup 100 will now be described. As shown in FIG. 1B, in the optical pickup 100, the return light separated by the beam splitter 3 is divided into a first optical path P1 and a second optical path P2 by the hologram device 8, the return light on the first optical path P1 is received by the first detector 11, the return light on the second optical path P2 is received by the second detector 12, and a predetermined arithmetic operation is performed to the photodetection electric signal generated by the photoelectric conversion, thereby generating a focusing error signal.

FIGS. 2A to 2D are diagrams for explaining a construction of the hologram device 8 in the optical pickup 100. The hologram device 8 has a first hologram portion 15 and a second hologram portion 16.

Figure 2A:
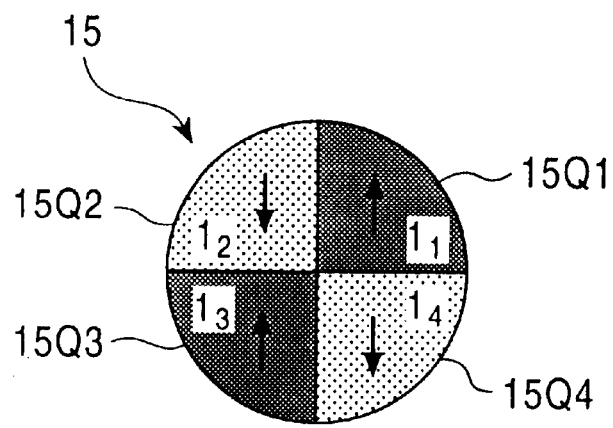
FIGS. 2A to 2D are diagrams for explaining a construction of a hologram device in the optical pickup according to the first embodiment of the invention.

As shown in FIG. 2A, the first hologram portion 15 has a function equivalent to a prism for separating the light existing in a first quadrant region 15Q1 and a third quadrant region 15Q3 on a plane that is perpendicular to an optical axis of the return light to a first optical path (shown in the upward direction in FIG. 2A). The first hologram portion 15 also has a function equivalent to a prism for separating the light existing in a second quadrant region 15Q2 and a fourth quadrant region 15Q4 on a plane that is perpendicular to the optical axis of the return light to a second optical path (shown in the downward direction in FIG. 2A). In this case, the first hologram portion 15 corresponds to optical path separating means.

Figure 2B:
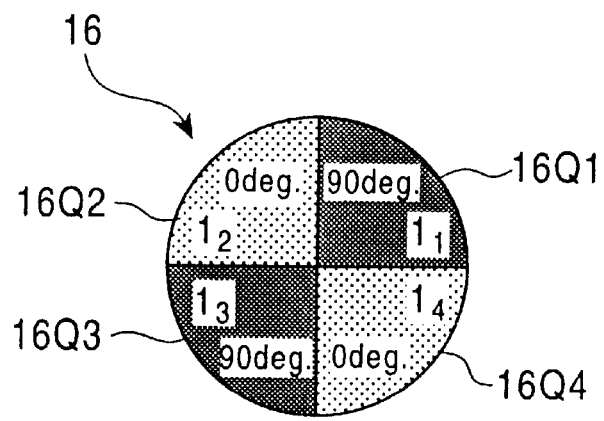
Figure 2C:
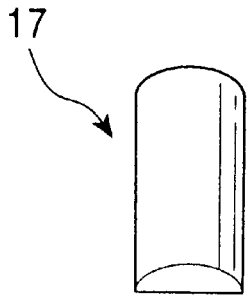

In the second hologram portion 16 shown in FIG. 2B, a first quadrant region 16Q1 and a third quadrant region 16Q3 apply a first astigmatism to the light on the first optical path to thereby obtain first processing light. This function is equivalent to, for example, an optical device in which a cylindrical lens 17 shown in FIG. 2C is arranged in the first quadrant region 16Q1 and third quadrant region 16Q3. The first quadrant region 16Q1 and third quadrant region 16Q3 of the second hologram portion 16 correspond to first optical processing means.

Figure 2D:
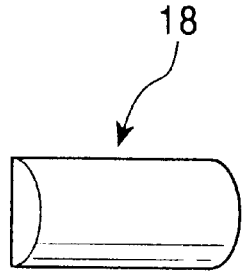

In the second hologram portion 16, a second quadrant region 16Q2 and a fourth quadrant region 16Q4 apply a second astigmatism to the light on the second optical path to thereby obtain second processing light. The second astigmatism is set to the direction that is inclined by 90° for the direction of the first astigmatism, as indicated by "90 deg." and "0 deg." respectively in FIG. 2B. This function is equivalent to, for example, an optical device in which a cylindrical lens 18 shown in FIG. 2D is arranged in the second quadrant region 16Q2 and fourth quadrant region 16Q4. That is, a major axis (axis in the horizontal direction in FIG. 2D) of the cylindrical lens 18 is inclined by 90° for a major axis (axis in the vertical direction in FIG. 2C) of the cylindrical lens 17. The second quadrant region 16Q2 and fourth quadrant region 16Q4 of the second hologram portion 16 correspond to second optical processing means. The hologram device 8 corresponds to focus error detecting optical device.

Constructions and the operations of the first detector 11 and second detector 12 in the optical pickup 100 will now be described with reference to FIGS. 3A and 3B.

Figure 3A:
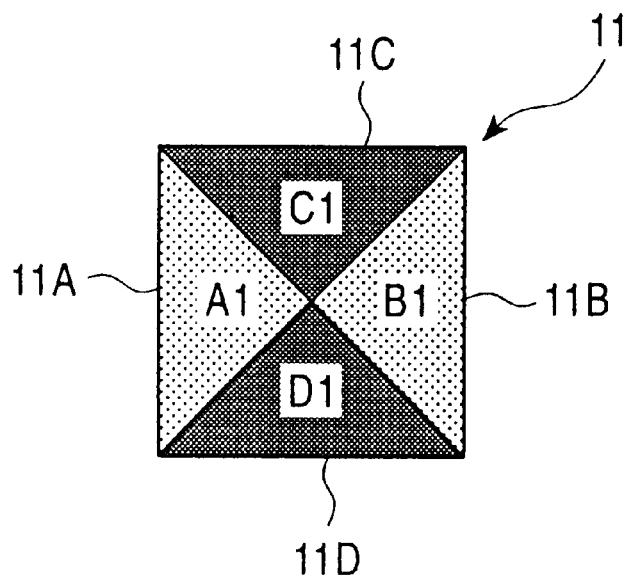
FIGS. 3A and 3B are diagrams for explaining constructions and the operations of a first detector and a second detector in the optical pickup according to the first embodiment of the invention.

As shown in FIG. 3A, the first detector 11 has four first photosensing portions 11A, 11B, 11C, and 11D. Photosensing portion boundary lines to partition the four first photosensing portions 11A to 11D are inclined by 45° for quadrant partition lines of the first to the fourth quadrant regions 15Q1 to 15Q4 or 16Q1 to 16Q4, thereby forming a detector divided into four portions like an X-shape.

As shown in FIG. 2B, the light on the first optical path P1 emitted from the hologram device 8 (first processing light to which the first astigmatism has been applied by the first quadrant region 16Q1 and third quadrant region 16Q3 of the second hologram portion 16) enters the first detector 11. In the first processing light, the light to which the first astigmatism has been applied by the first quadrant region 16Q1 of the second hologram portion 16 enters so as to extend over the first photosensing portions 11A and 11C. In the first processing light, the light to which the first astigmatism has been applied by the third quadrant region 16Q3 of the second hologram portion 16 enters so as to extend over the first photosensing portions 11B and 11D.

In FIG. 3A, A1 denotes a value of a photodetection electric signal generated by photoelectrically converting the light received by the first photosensing portion 11A, B1 denotes a value of a photodetection electric signal generated by photoelectrically converting the light received by the first photosensing portion 11B, C1 denotes a value of a photodetection electric signal generated by photoelectrically converting the light received by the first photosensing portion 11C, and D1 denotes a value of a photodetection electric signal generated by photoelectrically converting the light received by the first photosensing portion 11D, respectively. The first detector 11 corresponds to a first photodetector.

Figure 3B:
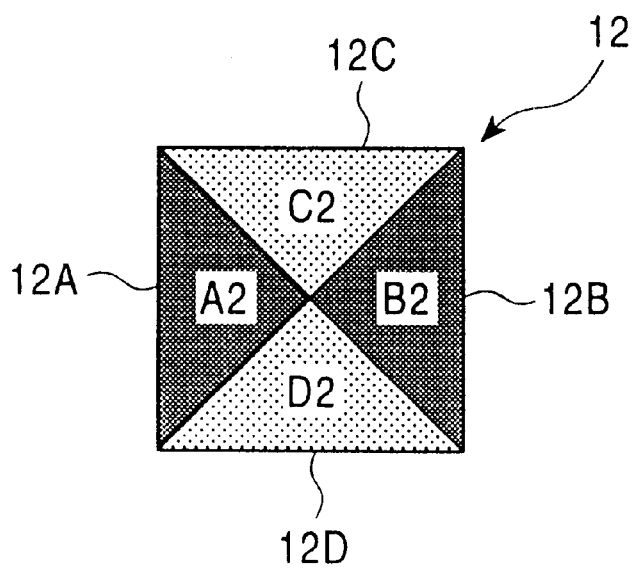

As shown in FIG. 3B, the second detector 12 has four second photosensing portions 12A, 12B, 12C, and 12D. Photosensing portion boundary lines to partition the four second photosensing portions 12A to 12D are inclined by 45° for quadrant partition lines of the first to the fourth quadrant regions 15Q1 to 15Q4 or 16Q1 to 16Q4, thereby forming a detector divided into four portions like an X-shape.

As shown in FIG. 2B, the light on the second optical path P2 emitted from the hologram device 8 (second processing light to which the second astigmatism has been applied by the second quadrant region 16Q2 and fourth quadrant region 16Q4 of the second hologram portion 16) enters the second detector 12. In the second processing light, the light to which the second astigmatism has been applied by the second quadrant region 16Q2 of the second hologram portion 16 enters so as to extend over the second photosensing portions 12B and 12C. In the second processing light, the light to which the second astigmatism has been applied by the fourth quadrant region 16Q4 of the second hologram portion 16 enters so as to extend over the second photosensing portions 12D and 12A.

In FIG. 3B, A2 denotes a value of a photodetection electric signal generated by photoelectrically converting the light received by the second photosensing portion 12A, B2 denotes a value of a photodetection electric signal generated by photoelectrically converting the light received by the second photosensing portion 12B, C2 denotes a value of a photodetection electric signal generated by photoelectrically converting the light received by the second photosensing portion 12C, and D2 denotes a value of a photodetection electric signal generated by photoelectrically converting the light received by the second photosensing portion 12D, respectively. The second detector 12 corresponds to a second photodetector.

The operation when a focal position is changed in the optical pickup 100 will now be described with reference to FIGS. 4A to 4C. FIG. 4B is a diagram showing a state of the return light spots in the first detector 11 and second detector 12 in the case where the emission light from the optical pickup 100 is in an in-focus state on the information recording surface of the optical disc.

As shown at the upper stage in FIG. 4B, in the in-focus state, the light to which the second astigmatism has been applied by the first quadrant region 16Q1 of the second hologram portion 16 of the hologram device 8 enters as a light spot of a quarter circle shape around the photosensing portion. boundary line of the first photosensing portions 11A and 11C of the first detector 11 as a center, and the light to which the second astigmatism has been applied by the third quadrant region 16Q3 of the second hologram portion 16 of the hologram device 8 enters as a light spot of a quarter circle shape around the photosensing portion boundary line of the first photosensing portions 11B and 11D of the first detector 11 as a center.

In this case, the two light spots of the quarter circle shape on the first detector 11 have the same shape and size (area). In the in-focus state, therefore, in the first detector 11, the photodetection electric signal A1 which is generated by the first photosensing portion 11A and the photodetection electric signal C1 which is generated by the first photosensing portion 11C are equal. The photodetection electric signal B1 which is generated by the first photosensing portion 11B and the photodetection electric signal D1 which is generated by the first photosensing portion 11D are equal. The sum (A1+C1) of the photodetection electric signals A1 and C1 and the sum (B1+D1) of the photodetection electric signals B1 and D1 are equal.

As shown at the lower stage in FIG. 4B, in the in-focus state, the light to which the second astigmatism has been applied by the second quadrant region 16Q2 of the second hologram portion 16 of the hologram device 8 enters as a light spot of a quarter circle shape around the photosensing portion boundary line of the second photosensing portions 12A and 12D of the second detector 12 as a center, and the light to which the second astigmatism has been applied by the fourth quadrant region 16Q4 of the second hologram portion 16 of the hologram device 8 enters as a light spot of a quarter circle shape around the photosensing portion boundary line of the second photosensing portions 12B and 12C of the second detector 12 as a center.

In this case, the two light spots of the quarter circle shape on the second detector 12 have the same shape and size (area) and have the same shape and size (area) as those of the two light spots of the quarter circle shape on the first detector 11. In the in-focus state, therefore, in the second detector 12, the photodetection electric signal A2 which is generated by the second photosensing portion 12A and the photodetection electric signal D2 which is generated by the second photosensing portion 12D are equal. The photodetection electric signal B2 which is generated by the second photosensing portion 12B and the photodetection electric signal C2 which is generated by the second photosensing portion 12C are equal. The sum (A2+D2) of the photodetection electric signals A2 and D2 and the sum (B2+C2) of the photodetection electric signals B2 and C2 are equal.

The following equation (1)

$$A1=B1=C1=D1=A2=B2=C2=D2 \quad (1)$$

is satisfied.

If a value of FE expressed by the following equation (2)

$$FE=(A2+B2+C1+D1)-(A1+B1+C2+D2) \quad (2)$$

is arithmetically operated by an arithmetic operating circuit (not shown) connected to an output side of the photodetecting portion 9, consequently, the value of FE becomes zero in the in-focus state.

Figure 4A:
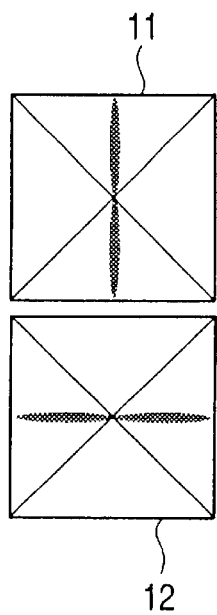
FIGS. 4A to 4C are diagrams for explaining the operation when a focal position is changed in the optical pickup according to the first embodiment of the invention.
Figure 4B:
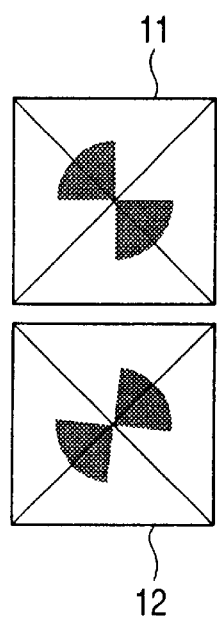

FIG. 4A is a diagram showing states of the return light spots in the first detector 11 and second detector 12 in the case where the emission light from the optical pickup 100 is in an out-of-focus state on the information recording surface of the optical disc and the optical disc is located at a position that is nearer than that in the in-focus state.

As shown at the upper stage in FIG. 4A, when the optical disc is located at a position that is nearer than that in the in-focus state, the light to which the second astigmatism has been applied by the first quadrant region 16Q1 of the second hologram portion 16 of the hologram device 8 enters as a light spot of a line segment shape extending on the center line of the first photosensing portion 11C of the first detector 11, and the light to which the second astigmatism has been applied by the third quadrant region 16Q3 of the second hologram portion 16 of the hologram device 8 enters as a light spot of a line segment shape extending on the center line of the first photosensing portion 11D of the first detector 11.

In this case, the two light spots of the line segment shape on the first detector 11 have the same shape and size (area). When the optical disc is located at a position that is nearer than that in the in-focus state, therefore, in the first detector 11, the photodetection electric signal C1 which is generated by the first photosensing portion 11C and the photodetection electric signal D1 which is generated by the first photosensing portion 11D are equal. The photodetection electric signal A1 which is generated by the first photosensing portion 11A and the photodetection electric signal B1 which is generated by the first photosensing portion 11B are equal and can be regarded as almost zero.

As shown at the lower stage in FIG. 4A, when the optical disc is located at a position that is nearer than that in the in-focus state, the light to which the second astigmatism has been applied by the second quadrant region 16Q2 of the second hologram portion 16 of the hologram device 8 enters as a light spot of a line segment shape extending on the center line of the second photosensing portion 12A of the second detector 12, and the light to which the second astigmatism has been applied by the fourth quadrant region 16Q4 of the second hologram portion 16 of the hologram device 8 enters as a light spot of a line segment shape extending on the center line of the second photosensing portion 12B of the second detector 12.

In this case, the two rod-shaped light spots on the second detector 12 have the same shape and size (area) and have the same shape and size (area) as those of the two rod-shaped light spots in the first detector 11. When the optical disc is located at a position that is nearer than that in the in-focus state, therefore, in the second detector 12, the photodetection electric signal A2 which is generated by the second photosensing portion 12A and the photodetection electric signal B2 which is generated by the second photosensing portion 12B are equal. The photodetection electric signal C2 which is generated by the second photosensing portion 12C and the photodetection electric signal D2 which is generated by the second photosensing portion 12D are equal and can be regarded as almost zero.

The following equation (3)

$$C1=D1=A2=B2 \qquad (3)$$

and the following equation (4)

$$A1=B1=C2=D2=0 \qquad (4)$$

are satisfied.

From these equations, by substituting the conditional equations (3) and (4) into the equation (2), FE1 as an FE value in this case is obtained by the following equation (5).

$$FE1=(A2+B2+C1+D1)-(A1+B1+C2+D2)=A2+B2+C1+D1 \\ =4\times A2 \qquad (5)$$

When the optical disc is located at a position that is nearer than that in the in-focus state, the FE value becomes a positive value.

Figure 4C:
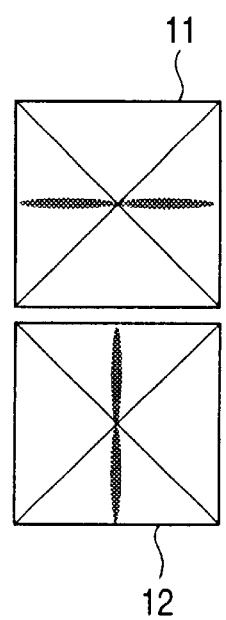

FIG. 4C is a diagram showing states of the return light spots in the first detector 11 and second detector 12 in the case where the emission light from the optical pickup 100 is in an out-of-focus state on the information recording surface of the optical disc and the optical disc is located at a position that is farther than that in the in-focus state.

As shown at the upper stage in FIG. 4C, when the optical disc is located at a position that is farther than that in the in-focus state, the light to which the second astigmatism has been applied by the first quadrant region 16Q1 of the second hologram portion 16 of the hologram device 8 enters as a light spot of a line segment shape extending on the center line of the first photosensing portion 11A of the first detector 11, and the light to which the second astigmatism has been applied by the third quadrant region 16Q3 of the second hologram portion 16 of the hologram device 8 enters as a rod-shaped light spot extending on the center line of the first photosensing portion 11B of the first detector 11.

In this case, the two rod-shaped light spots on the first detector 11 have the same shape and size (area). When the optical disc is located at a position that is farther than that in the in-focus state, therefore, in the first detector 11, the photodetection electric signal A1 which is generated by the first photosensing portion 11A and the photodetection electric signal B1 which is generated by the first photosensing portion 11B are equal. The photodetection electric signal C1 which is generated by the first photosensing portion 11C and the photodetection electric signal D1 which is generated by the first photosensing portion 11D are equal and can be regarded as almost zero.

As shown at the lower stage in FIG. 4C, when the optical disc is located at a position that is farther than that in the in-focus state, the light to which the second astigmatism has been applied by the second quadrant region 16Q2 of the second hologram portion 16 of the hologram device 8 enters as a light spot of a line segment shape extending on the center line of the second photosensing portion 12C of the second detector 12, and the light to which the second astigmatism has been applied by the fourth quadrant region 16Q4 of the second hologram portion 16 of the hologram device 8 enters as a rod-shaped light spot extending on the center line of the second photosensing portion 12D of the second detector 12.

In this case, the two rod-shaped light spots on the second detector 12 have the same shape and size (area) and have the same shape and size (area) as those of the two rod-shaped light spots in the first detector 11. When the optical disc is located at a position that is farther than that in the in-focus state, therefore, in the second detector 12, the photodetection electric signal C2 which is generated by the second photosensing portion 12C and the photodetection electric signal D2 which is generated by the second photosensing portion 12D are equal. The photodetection electric signal A2 which is generated by the second photosensing portion 12A and the photodetection electric signal B2 which is generated by the second photosensing portion 12B are equal and can be regarded as almost zero.

The following equation (6)

$$A1=B1=C2=D2 \qquad (6)$$

and the following equation (7)

$$C1=D1=A2=B2=0 \qquad (7)$$

are satisfied.

From these equations, by substituting the conditional equations (6) and (7) into the equation (2), FE2 as an FE value in this case is obtained by the following equation (8).

$$FE2=(A2+B2+C1+D1)-(A1+B1+C2+D2)=-(A1+B1+C2+D2)=-4\times A1 \qquad (8)$$

When the optical disc is located at a position that is farther than that in the in-focus state, the FE value becomes a negative value.

If the value of FE expressed by the equation (2) is used as a focusing error signal, therefore, it is possible to determine such that when the FE value is equal to zero, the in-focus state is obtained, when the FE value is equal to a positive value, the optical disc is located at a position that is nearer than that in the in-focus state, and when the FE value is equal to a negative value, the optical disc is located at a position that is farther than that in the in-focus state. By feeding back the electric signal obtained by inverting the positive/negative sign of the focusing error signal FE and controlling an objective lens driving mechanism (not shown) provided for the objective lens 7 of the optical pickup 100 so as to set the FE value to zero, therefore, a focusing servo control can be certainly performed. In this case, an arithmetic operating circuit (not shown) connected to the output side of the photodetecting portion 9 corresponds to focus error discrimination value operating means, and the focusing error signal value of FE corresponds to a focus error discrimination value.

By calculating a value of RF expressed by the following equation (9)

$$RF=A1+B1+C1+D1+A2+B2+C2+D2 \qquad (9)$$

by using the outputs of the first detector 11 and second detector 12, the optical disc recording information recorded on the optical disc can be read out from the RF signal.

By calculating values of DPD1, DPD2, DPD3, and DPD4 expressed by the following equations (10), (11), (12), and (13)

$$DPD1=A1+C1 \quad (10)$$

$$DPD2=B1+D1 \quad (11)$$

$$DPD3=A2+D2 \quad (12)$$

$$DPD4=C2+B2 \quad (13)$$

a tracking servo control of the DPD system can be performed by these signals.

By calculating a value PP expressed by the following equation (14)

$$PP=(A1+C1+C2+B2)-(A2+D2+B1+D1) \quad (14)$$

a tracking servo control by a Push-Pull method can be performed.

The third detector 13 and fourth detector 14 are arranged on both sides of the first detector 11 and second detector 12 as shown in FIG. 1B, either the third or fourth detector is used for a + primary subbeam, and the other is used for a − primary subbeam, thereby making it possible to also cope with the 3-beam system. In this case, the third detector 13 corresponds to the third photodetector and the fourth detector 14 corresponds to the fourth photodetector.

Figure 5A:
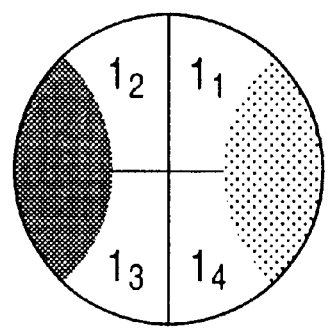
FIGS. 5A and 5B are diagrams for explaining an advantage of a focus error detecting method in the optical pickup according to the first embodiment of the invention.

According to the focus error detecting method in the optical pickup 100, the signal is not influenced by the track transversal noises. This point will now be described with reference to FIGS. 5A and 5B. FIG. 5A shows a light intensity distribution of a track diffracted light image which is irradiated onto a pupil surface (surface that is perpendicular to the optical axis at a converging position of the return light) when the optical pickup transverses the tracks of the optical disc. The light intensity distributions are unbalanced (offset) in the first and fourth quadrants and in the second and third quadrants.

Figure 5B:
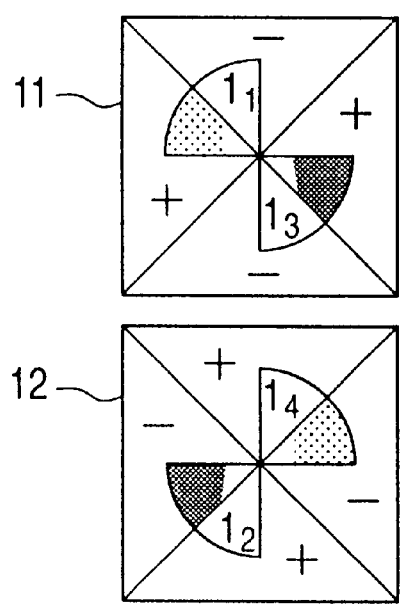

In case of the return light, in the first detector 11 and second detector 12 of the optical pickup 100, as shown in FIG. 5B, the light intensity distributions seem to be unbalanced. In the optical pickup 100, however, to calculate the focusing error signal value of FE by the equation (2), A1 and B2 are subtracted and A2 and B1 are subtracted, so that the influences by the track transversal noises are set off.

Figure 6A:
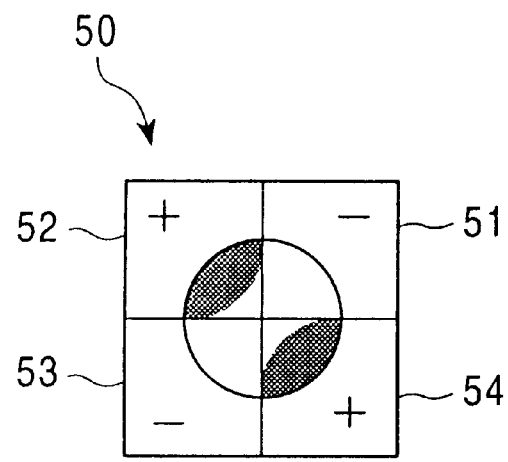
FIGS. 6A and 6B are diagrams for explaining an advantage of the focus error detecting method in the optical pickup according to the first embodiment of the invention.

In the focusing servo control using the astigmatism method, when the optical pickup has an aberration such as astigmatism or the like, light intensities of, for example, photosensing portions 52 and 54 among photosensing portions 51, 52, 53, and 54 of a 4-split detector 50 are large as shown in FIG. 6A. Since the focusing error signal in the astigmatism method is based on the addition or subtraction of the photodetection electric signals of the photosensing portions in the diagonal direction, when the unbalance of the light intensity distributions due to the aberration appears, track transversal noises occur and the focusing servo control cannot be accurately performed.

Figure 6B:
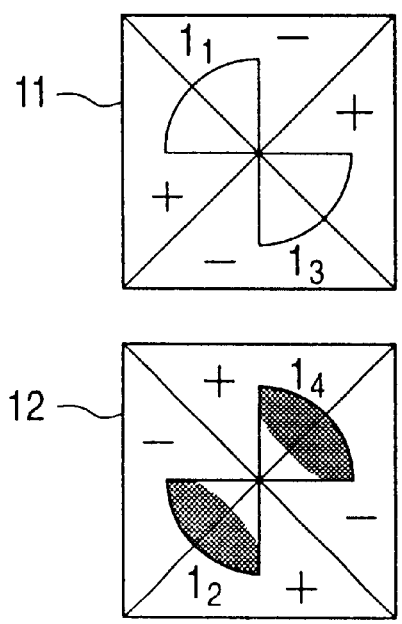

In case of the optical pickup 100 of the embodiment, however, a light intensity distribution on the detector as shown in FIG. 6B is obtained. The influences by the unbalance of the light intensity distributions due to the aberration, however, are set off in the step of calculating the focusing error signal FE by the equation (2).

In the conventional astigmatism method, in the case where a thickness of optical disc is not constant and there is an error of thickness depending on the location, the shape of the return light spot on the detector is deformed and the light which cannot be inherently received leaks or enters the other photosensing surface. An error occurs in the DPD tracking error signal. In the optical pickup 100 of the embodiment, when there is a thickness error of the disc, the shapes of the light spots on the first detector 11 and second detector 12 are deformed. The leakage or entering of the light between the quadrant regions, however, does not occur and the DPD tracking servo control can be performed without any practical trouble.

In the optical pickup 100 of the first embodiment, the hologram device 8, first detector 11, second detector 12, and arithmetic operating circuit (not shown) construct a focus error detecting apparatus.

(2) Second Embodiment

Figure 7A:
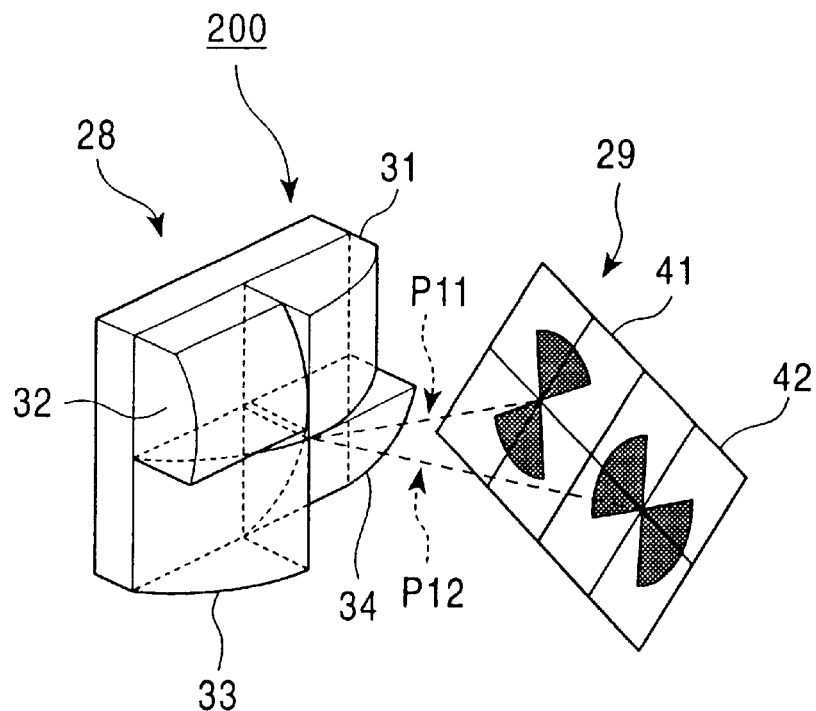
FIGS. 7A and 7B are diagrams for explaining a construction of a focus error detecting system in an optical pickup according to the second embodiment of the invention.
Figure 7B:
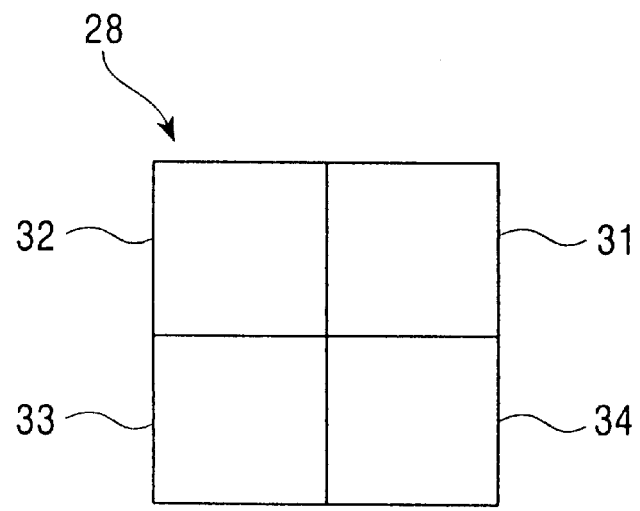
Figure 8:
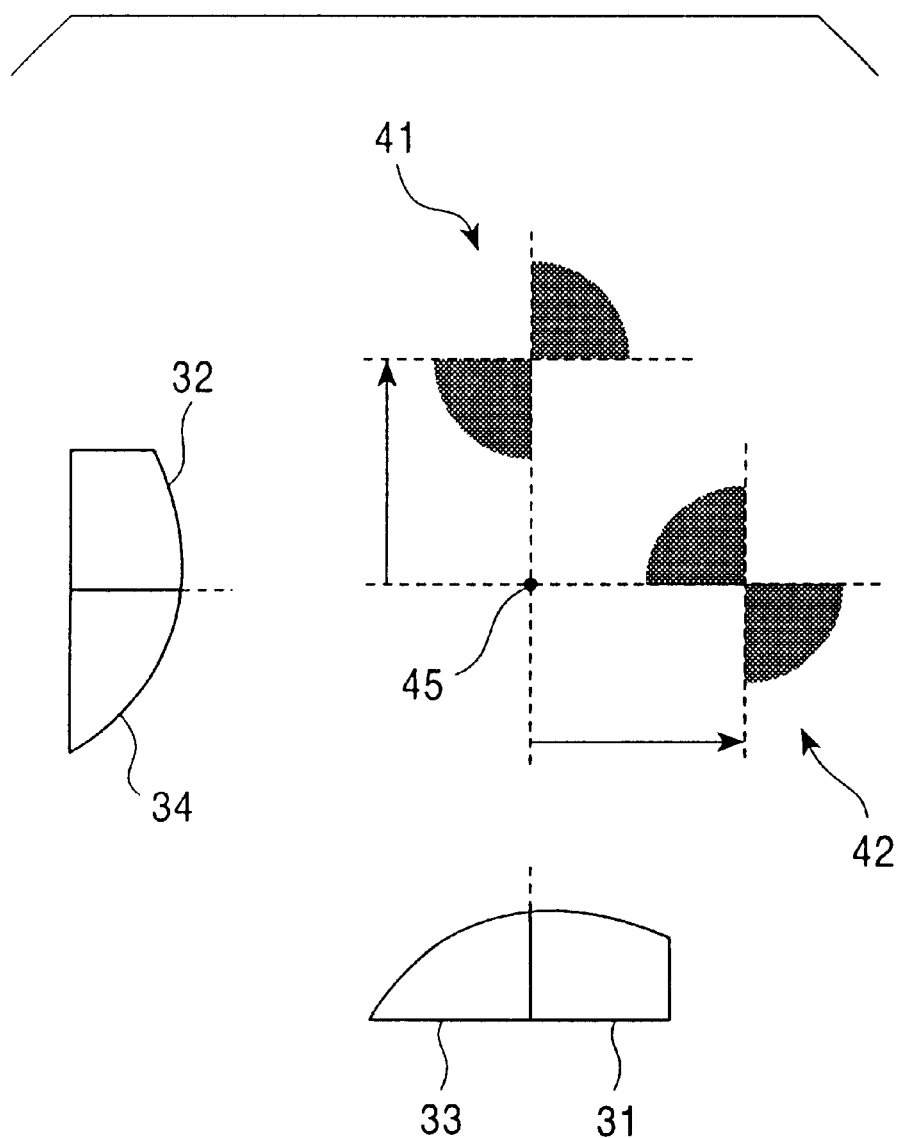
FIG. 8 is a diagram for explaining a construction and the operation of a lens device in the optical pickup according to the second embodiment of the invention.

The second embodiment of the invention will now be described. FIGS. 7A and 7B are diagrams for explaining a construction of a focus error detecting system in an optical pickup of the second embodiment of the invention. FIG. 8 is a diagram for explaining a construction and the operation of a lens device in the optical pickup of the second embodiment of the invention.

An optical pickup 200 of the second embodiment differs from the optical pickup 100 of the first embodiment with respect to a point that a lens device 28 is provided in place of the hologram device 8 and a photodetecting portion 29 is provided in place of the photodetecting portion 9. The other component elements of the optical pickup are similar to those of the optical pickup 100. The photodetecting portion 29 has a first detector 41 and a second detector 42.

As shown in FIGS. 7A, 7B, and 8, the lens device 28 is constructed by arranging a first lens portion 31, a second lens portion 32, a third lens portion 33, and a fourth lens portion 34 each of which has an eccentric cylindrical lens shape in the first, second, third, and fourth quadrants, respectively. FIG. 8 shows side elevational shapes of the lens portions 31 to 34. As will be understood from the diagram, a major axial direction of the eccentric cylindrical lens comprising the first lens portion 31 and third lens portion 33 is a direction inclined by an angle of 90° for a major axial direction of the eccentric cylindrical lens comprising the second lens portion 32 and fourth lens portion 34.

The lens portions 31 to 34 have both a function to separate the optical path of the incident light and a function to apply an astigmatism to the passing light and have a function similar to the hologram device 8 of the first embodiment.

With this construction, as shown in FIGS. 7A, 7B, and 8, the light emitted from the lens device 28 is separated to a first optical path P11 and a second optical path P12 in a manner similar to the case of the first embodiment and an astigmatism is applied thereto. In the second embodiment, the lens device 28 corresponds to a focus error detecting optical device.

In case of the second embodiment, as shown in FIG. 8, a center axis of the light image which is irradiated to each of the detectors 41 and 42 is moved for an inherent optical axis 45 before the laser beam enters the lens device 28.

Each of the detectors 41 and 42 is a detector divided in cross-shaped four portions. Each of the detectors 41 and 42 is arranged in a state where it is inclined by an angle of 45° for a "+"-shaped line serving as a boundary line of the photosensing portion. The first detector 41 corresponds to the first photodetector and the second detector 42 corresponds to the second photodetector.

Figure 9C:
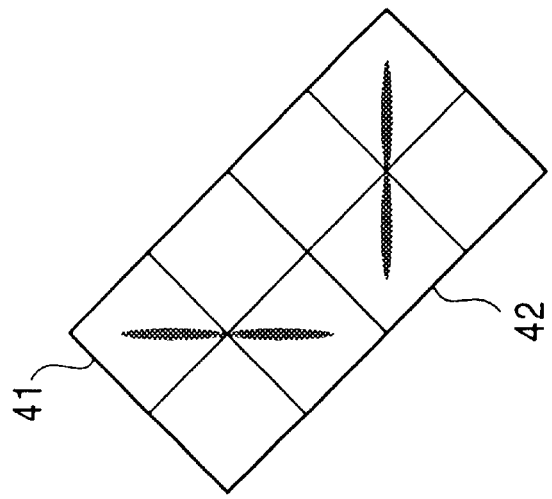
FIGS. 9A to 9C are diagrams for explaining the operation when the focal position is changed in the optical pickup according to the second embodiment of the invention.
Figure 9B:
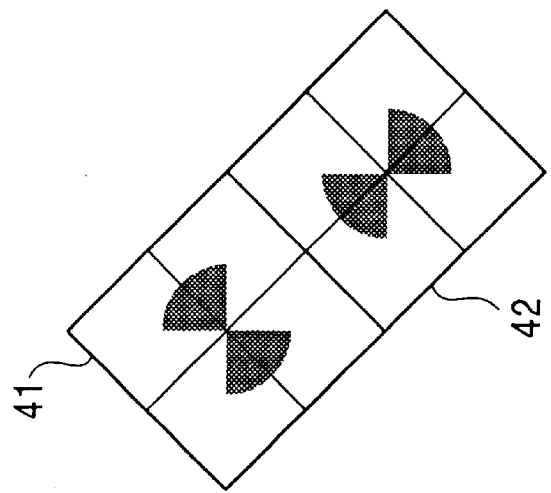
Figure 9A:
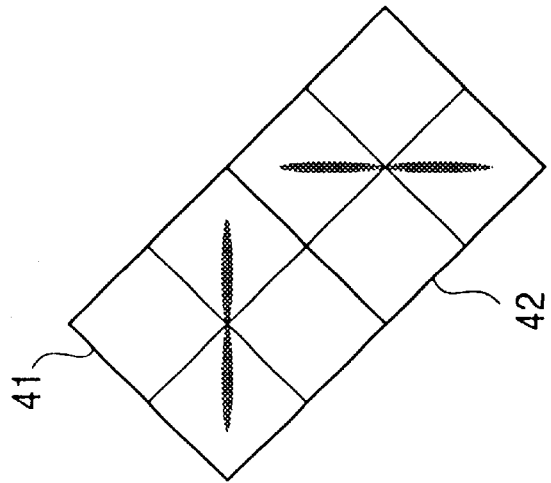

The operation when a focal position in the optical pickup 200 according to the second embodiment is changed will now be described with reference to FIGS. 9A to 9C. FIG. 9B is a diagram showing states of the return light spots in the first detector 41 and second detector 42 in the case where the emission light from the optical pickup 200 is in an in-focus state on the information recording surface of the optical disc. FIG. 9A is a diagram showing states of the return light spots in the first detector 41 and second detector 42 in the case where the emission light from the optical pickup 200 is in an out-of-focus state on the information recording surface of the optical disc and the optical disc is located at a position that is nearer than that in the in-focus state. FIG. 9C is a diagram showing states of the return light spots in the first detector 41 and second detector 42 in the case where the emission light from the optical pickup 200 is in an out-of-focus state on the information recording surface of the optical disc and the optical disc is located at a position that is farther than that in the in-focus state.

As shown in FIGS. 9A to 9C, even in case of the optical pickup 200 of the second embodiment, if a value of fe which is obtained by a predetermined arithmetic operation is used as a focusing error signal, it is possible to determine such that when the fe value is equal to zero, the in-focus state is obtained, when the fe value is equal to a value which is not equal to zero (for example, positive value), the optical disc is located at a position that is nearer than that in the in-focus state, and when the fe value is equal to another value which is not equal to zero (for example, negative value), the optical disc is located at a position that is farther than that in the in-focus state. By feeding back the electric signal obtained by inverting the positive/negative sign of the focusing error signal fe and controlling an objective lens driving mechanism (not shown) provided for a objective lens (not shown) of the optical pickup 200 so as to set the fe value to zero, therefore, a focusing servo control can be certainly performed. In this case, an arithmetic operating circuit (not shown) connected to the output side of the photodetecting portion 29 corresponds to focus error discrimination value operating means, and the focusing error signal value of fe corresponds to a focus error discrimination value.

Figure 10:
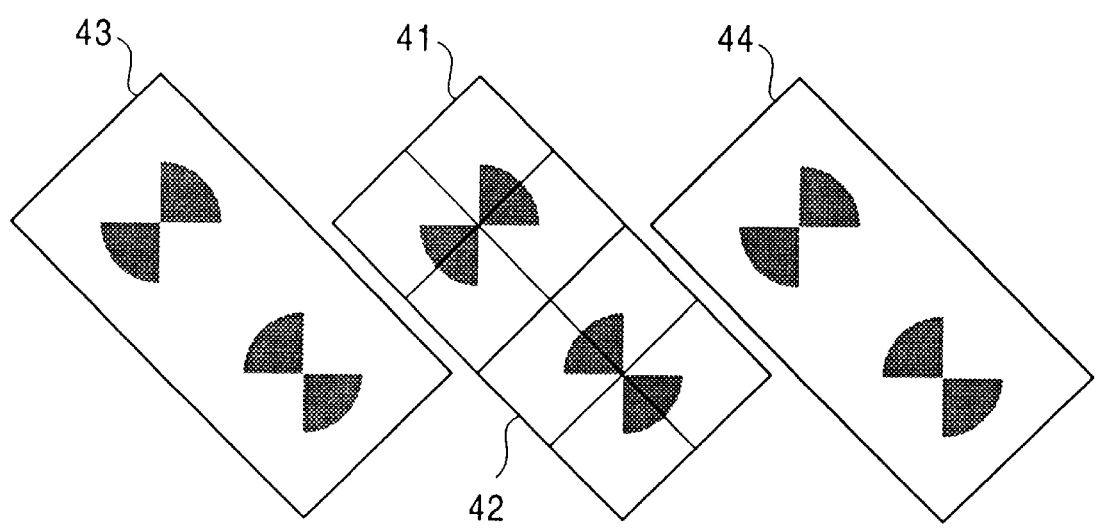
FIG. 10 is a diagram showing a construction of a photodetecting portion in the optical pickup according to the second embodiment of the invention.

A third detector 43 and a fourth detector 44 are arranged on both sides of the first detector 41 and second detector 42 as shown in FIG. 10, either the third or fourth detector is used for a + primary subbeam, and the other is used for a − primary subbeam, thereby making it possible to also cope with the 3-beam system. In this case, the third detector 43 corresponds to the third photodetector and the fourth detector 44 corresponds to the fourth photodetector.

In the optical pickup 200 of the second embodiment, the lens device 28, first detector 41, second detector 42, and an arithmetic operating circuit (not shown) construct a focus error detecting apparatus.

The invention is not limited to the embodiments. The embodiments are shown as examples and have substantially the same construction as that of the technical idea disclosed in the scope of claims for a patent of the present invention and all modifications having operations and effects similar to those of the invention are incorporated in the technical scope of the invention.

For example, although the embodiments have been described with respect to the hologram device 8 and lens device 28 as examples of the focus error detecting optical device, the invention is not limited to these examples. A focus error detecting optical device of another construction, for example, the first hologram portion 15 and another optical device are combined and the other optical device can be constructed in a manner such that the cylindrical lenses are arranged in the first to fourth quadrants so as to be mutually inclined by every angle of 90°, or a prism device in which prisms are arranged in the first to fourth quadrants can be used as a first optical device and the second hologram portion 16 can be used as a second optical device. In brief, a focus error detecting optical device having any construction can be used so long as it comprises: optical path separating means for separating the light existing in the first and third quadrant regions on the plane that is perpendicular to the optical axis of the return light to the first optical path and separating the light existing in the second and fourth quadrant regions on the plane that is perpendicular to the optical axis to the second optical path; first optical processing means for applying a first astigmatism to the light on the first optical path to thereby form the first processing light; and second optical processing means for applying a second astigmatism in the direction that is inclined by 90° for the direction of the first astigmatism to the light on the second optical path to thereby form the second processing light.

Although the hologram device 8 is arranged in front of the photodetecting portion 9 as shown in FIGS. 1A and 1B in the first embodiment, a polarization hologram device having a function similar to that of the hologram device 8 and having a polarizing function can be also arranged between the mirror 5 and ¼ wavelength plate 6.

According to the invention, as described above, since the return light from the optical disc is divided into two optical paths and a predetermined astigmatism is applied to the light of each divided optical path, there are advantages such that the signal is not easily influenced by the track transversal noises or optical disc thickness error, both of the 3-beam system and the DPD system can be used in common, the sensitivity of the detection of the out-of-focus state is high, and the optical pickup can be also miniaturized.

Figure 11A:
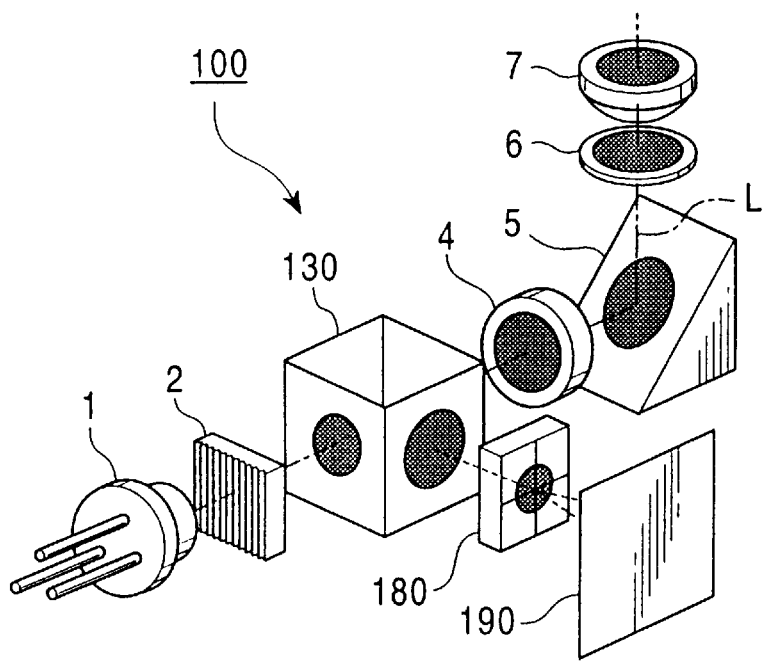
FIGS. 11A and 11B are diagrams showing a construction of the optical pickup according to an embodiment of the invention.
Figure 11B:
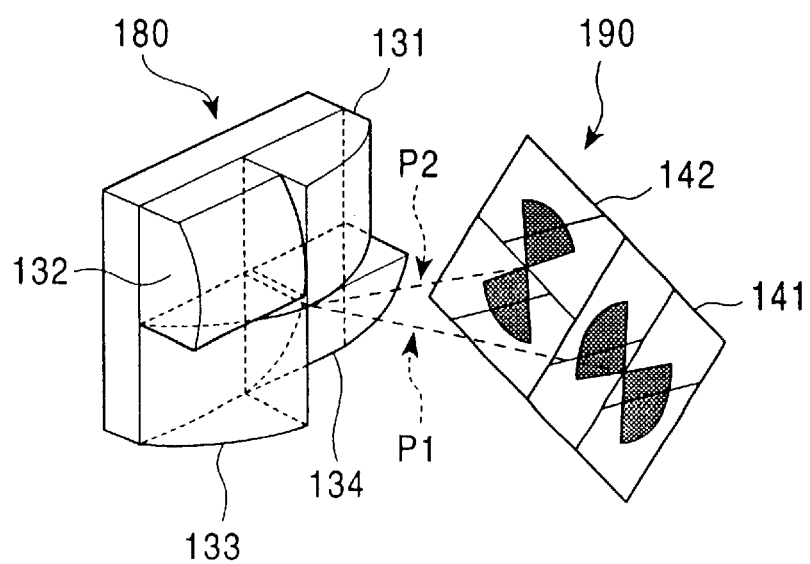

FIGS. 11A and 11B are diagrams showing a construction of an optical pickup according to another embodiment of the invention. As shown in FIG. 11A, the optical pickup 100 comprises: the semiconductor laser 1 as a light source; the grating 2; a beam splitter 130; the collimator lens 4; the mirror 5; the ¼ wavelength plate 6; the objective lens 7; a lens device 180; and a photodetecting portion 190. An objective lens driving mechanism (not shown) which can move the objective lens 7 forward and backward in the optical axial direction is provided for the objective lens 7.

As shown in FIG. 11B, the photodetecting portion 190 has a first detector 141 and a second detector 142. The photodetecting portion 190 further has a third detector 143 and a fourth detector 144 and these detectors will be explained hereinlater. An arithmetic operating circuit (not shown) comprising an adder and a subtractor for performing predetermined arithmetic operations on the basis of a photodetection electric signal generated from each detector is connected to the first detector 141 and second detector 142.

The laser beam L emitted from the semiconductor laser 1 enters the beam splitter 130 through the grating 2. The beam splitter 130 has a polarization mirror. The incident laser beam L passes through the beam splitter 130 and is transmitted through the collimator lens 4. An optical path of the laser beam is turned by a right angle by the mirror 5 and, thereafter, the laser beam passes through the ¼ wavelength plate 6 and is irradiated from the objective lens 7 onto the information recording surface of an optical disc (not shown) locating at an upper position in the diagram. Optical disc recording information can be written to the information recording surface of the optical disc by the irradiation light.

The laser beam L is reflected by the information recording surface of the optical disc, returned along the same optical path, transmitted through the objective lens 7, ¼ wavelength plate 6, mirror 5, and collimator lens 4, and enters the beam splitter 130 again. In this case, the optical path of the return light is changed in the direction different from the direction toward the semiconductor laser 1 by the beam splitter 130. After that, the laser beam passes through the lens device 180 and enters the photodetecting portion 190. The photodetecting portion 190 photoelectrically converts the received light and generates a photodetection electric signal. The optical disc recording information can be read out from the photodetection electric signal.

A focus error detecting method in the optical pickup 100 will now be described. As shown in FIG. 11B, in the optical pickup 100, the return light separated by the beam splitter 130 is divided into the first optical path P1 and second optical path P2 by the lens device 180, the return light on the first optical path P1 is received by the first detector 141, the return light on the second optical path P2 is received by the second detector 142, and a predetermined arithmetic operation is performed to the photodetection electric signal generated by the photoelectric conversion, thereby generating a focusing error signal.

Figure 12:
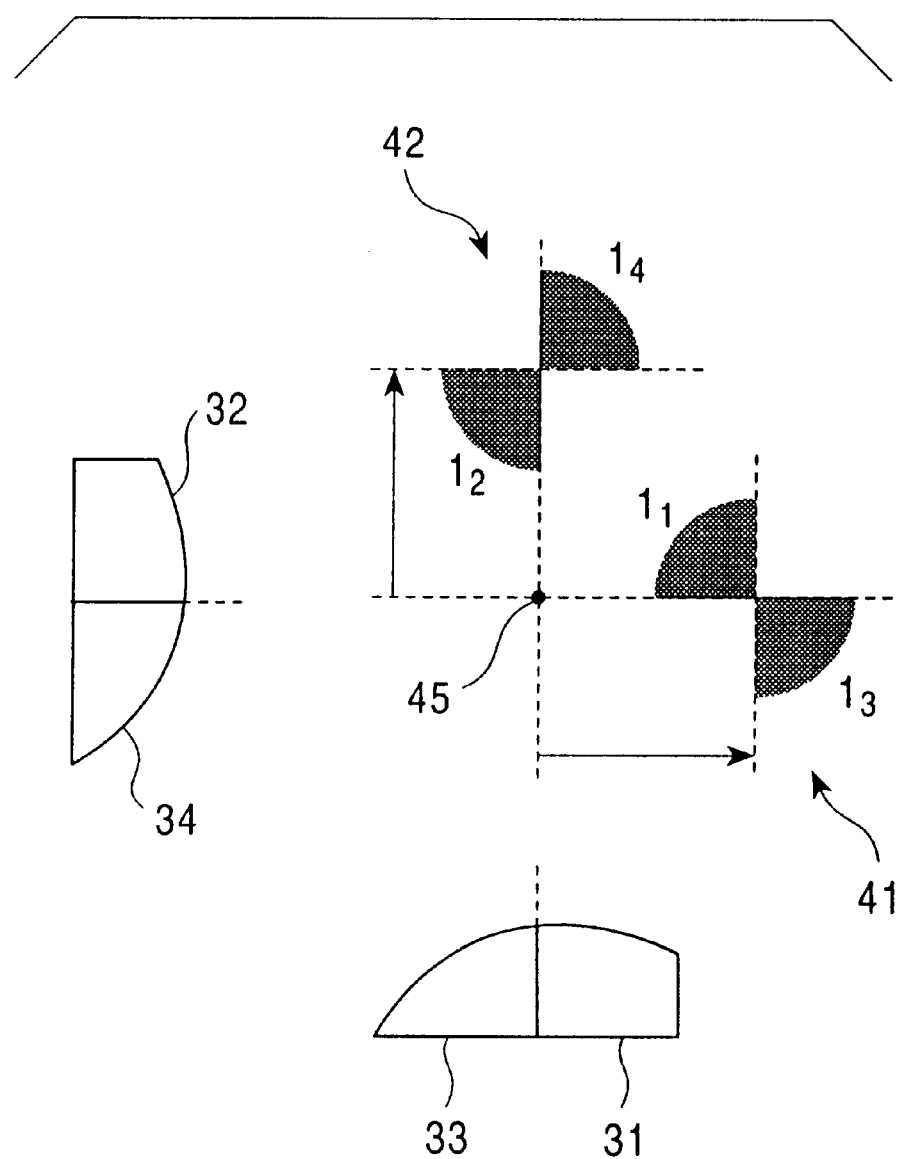
FIG. 12 is a diagram for explaining a construction and the operation of a lens device in the optical pickup in an embodiment of the invention.

The lens device 180 in the optical pickup 100 is constructed by arranging a first lens portion 131, a second lens portion 132, a third lens portion 133, and a fourth lens portion 134 each of which has an eccentric cylindrical lens shape in the first, second, third, and fourth quadrant regions, respectively. FIG. 12 shows side elevational shapes of the lens portions 131 to 134. As will be understood from the diagram, a major axial direction of the eccentric cylindrical lens comprising the first lens portion 131 and third lens portion 133 is a direction inclined by an angle of 90° for a major axial direction of the eccentric cylindrical lens comprising the second lens portion 132 and fourth lens portion 134.

As shown in FIG. 12, the lens portions 131 to 134 have a function of a focus error detecting optical device such that the light $l_1$ and $l_3$ existing in the first quadrant region and the third quadrant region on the plane that is perpendicular to the optical axis of the return light is separated to the first optical path, the light $l_2$ and $l_4$ existing in the second quadrant region and the fourth quadrant region on the plane that is perpendicular to the optical axis is separated to the second optical path, a first astigmatism is applied to the light on the first optical path to thereby form first processing light, and a second astigmatism in the direction that is inclined by 90° for that of the first astigmatism is applied to the light on the second optical path to thereby form second processing light.

In the above description, the first quadrant region denotes a region in which when a plane is divided into four regions by an X axis in the horizontal direction and a Y axis in the vertical direction that is perpendicular to the X axis, both the X coordinate and the Y coordinate are set to positive values. The second quadrant region is a region adjacent to the first quadrant region among the four regions, the X coordinate is set to a negative value, and the Y coordinate is set to a positive value. The third quadrant region is a region adjacent to the second quadrant region among the four regions and both the X coordinate and the Y coordinate are set to negative values. The fourth quadrant region is a region adjacent to the first and third quadrant regions among the four regions, the X coordinate is set to a positive value, and the Y coordinate is set to a negative value.

Figure 13:
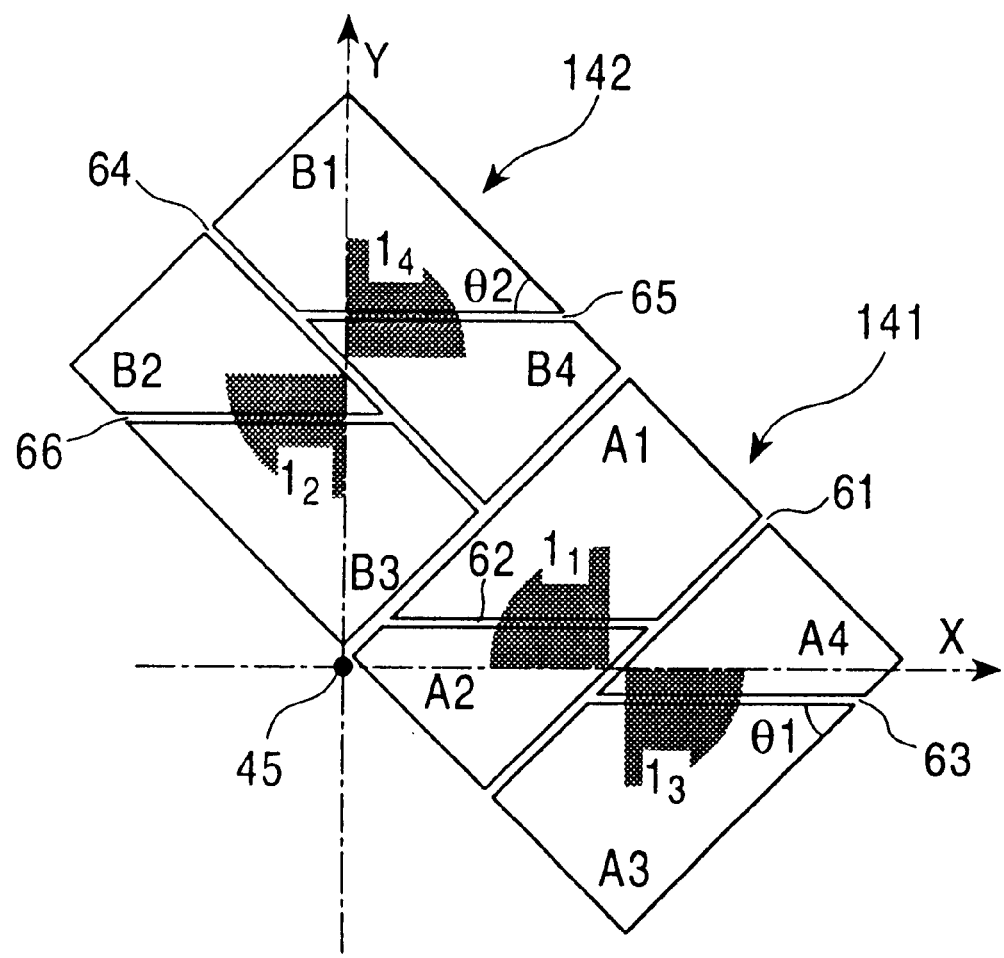
FIG. 13 is a diagram for explaining constructions and the operations of a first detector and a second detector in the optical pickup in an embodiment of the invention.

FIG. 13 is a diagram for explaining constructions and the operations of the first detector 141 and second detector 142 in the optical pickup 100. As shown in FIG. 13, the first detector 141 has a square (hereinafter, referred to as a "first square") shape in which the whole photosensing area is inclined by 45°. The second detector 142 has a square (hereinafter, referred to as a "second square") shape in which the whole photosensing area is inclined by 45°. The first and second detectors are arranged so that an upper left oblique side of the first square and an lower right oblique side of the second square are shared by each square.

The first detector 141 is divided into four first photosensing portions A1, A2, A3, and A4 by a first uniform dividing line 61 which is parallel with the lower right oblique line or the upper left oblique line of the first square and uniformly divides the first square into two rectangles and two parallel dividing lines 62 and 63 which form a first dividing angle è1 for the first uniform dividing line 61. That is, in the first detector 141, the photosensing area as a first square is divided into four portions by the dividing lines 61, 62, and 63 forming a lightning shape (almost "N"-character shape or almost "Z"-character shape) and the first photosensing portions A1 to A4 are trapezoidal areas.

The second detector 142 is divided into four second photosensing portions B1, B2, B3, and B4 by a second uniform dividing line 64 which is parallel with the upper right oblique line or the lower left oblique line of the second square and uniformly divides the second square into two rectangles and two parallel dividing lines 65 and 66 which form a second dividing angle è2 for the second uniform dividing line 64. That is, in the second detector 142, the photosensing area as a second square is divided into four portions by the dividing lines 64, 65, and 66 forming a lightning shape (almost "S"-character shape) and the second photosensing portions B1 to B4 are trapezoidal areas. In the second detector 142, the second uniform dividing line 64 is perpendicular to the first uniform dividing line 61 in the first detector 141. Each photosensing portion and each dividing line of the first detector 141 and second detector 142 are mutually mirror-symmetrical. The first dividing angle è1 and second dividing angle è2 are equal.

As shown in FIG. 11B, the light (first processing light) of the first optical path P1 emitted from the lens device 180 enters the first detector 141. In the first processing light, light $l_1$ to which the first astigmatism has been applied in the first quadrant region enters so as to extend over the first photosensing portions A1 and A2 as shown in FIG. 13. In the first processing light, light $l_3$ to which the first astigmatism has been applied in the third quadrant region enters so as to extend over the first photosensing portions A3 and A4 as shown in FIG. 13. The first detector 141 corresponds to the first photodetector.

As shown in FIG. 11B, the light (second processing light) of the second optical path P2 emitted from the lens device 180 enters the second detector 142. In the second processing light, light $l_2$ to which the second astigmatism has been applied in the second quadrant region enters so as to extend over the second photosensing portions B2 and B3 as shown in FIG. 13. In the second processing light, light $l_4$ to which the second astigmatism has been applied in the fourth quadrant region enters so as to extend over the second photosensing portions B4 and B1 as shown in FIG. 13. The second detector 142 corresponds to the second photodetector.

As shown in FIGS. 12 and 13, a center axis of the light image which is irradiated to each of the detectors 141 and 142 is moved for the inherent optical axis 45 before the laser beam enters the lens device 180.

The operation when the focal position in the optical pickup 100 is changed will now be described with reference to FIGS. 14A and 14B. FIG. 14B is a diagram showing states of the return light spots in the first detector 141 and second detector 142 in the case where the emission light from the optical pickup 100 is in the in-focus state on the information recording surface of the optical disc.

As shown at the lower stage in FIG. 14B and the lower stage in FIG. 13, in the in-focus state, the first processing light to which the first astigmatism has been applied by the first quadrant region of the lens device 180 enters the first photosensing portions A1 and A2 as a light spot of a quarter circular shape so as to sandwich the dividing line 62 of the first detector 141, and the first processing light to which the first astigmatism has been applied by the third quadrant region of the lens device 180 enters the first photosensing portions A3 and A4 as a light spot of a quarter circular shape so as to sandwich the dividing line 63 of the first detector 141.

As shown at the upper stage in FIG. 14B and the upper stage in FIG. 13, in the in-focus state, the second processing light to which the second astigmatism has been applied by the second quadrant region of the lens device 180 enters the second photosensing portions B2 and B3 as a light spot of a quarter circular shape so as to sandwich the dividing line 66 of the second detector 142, and the second processing light to which the second astigmatism has been applied by the fourth quadrant region of the lens device 180 enters the second photosensing portions B4 and B1 as a light spot of a quarter circular shape so as to sandwich the dividing line 65 of the second detector 142.

In this case, in the in-focus state, the photodetection electric signal A1 which is generated by the first photosensing portion A1, the photodetection electric signal A3 which is generated by the first photosensing portion A3, the photodetection electric signal B1 which is generated by the second photosensing portion B1, and the photodetection electric signal B3 which is generated by the second photosensing portion B3 are equal. In the in-focus state, the photodetection electric signal A2 which is generated by the first photosensing portion A2, the photodetection electric signal A4 which is generated by the first photosensing portion A4, the photodetection electric signal B2 which is generated by the second photosensing portion B2, and the photodetection electric signal B4 which is generated by the second photosensing portion B4 are equal.

The following equation (15)

$$A1=A3=B1=B3 \tag{15}$$

and the following equation (16)

$$A2=A4=B2=B4 \tag{16}$$

are satisfied.

If a value of FE expressed by the following equation (17)

$$FE=(A1+A3+B2+B4)-(A2+A4+B1+B3) \tag{17}$$

is arithmetically operated by an arithmetic operating circuit (not shown) connected to an output side of the photodetecting portion 190, consequently, the value of FE becomes zero in the in-focus state.

Figure 14C:
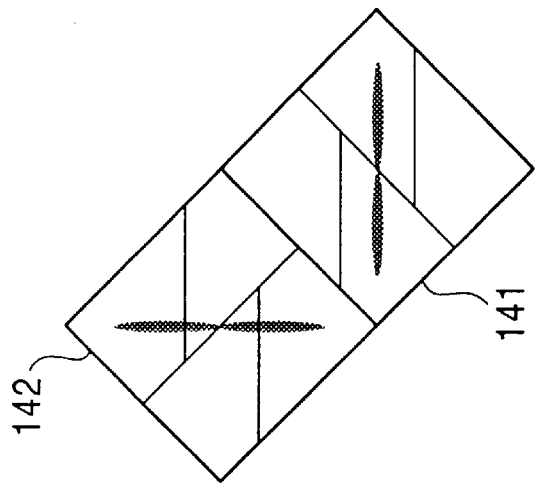
FIGS. 14A to 14C are diagrams for explaining the operation when the focal position is changed in the optical pickup in an embodiment of the invention.
Figure 14B:
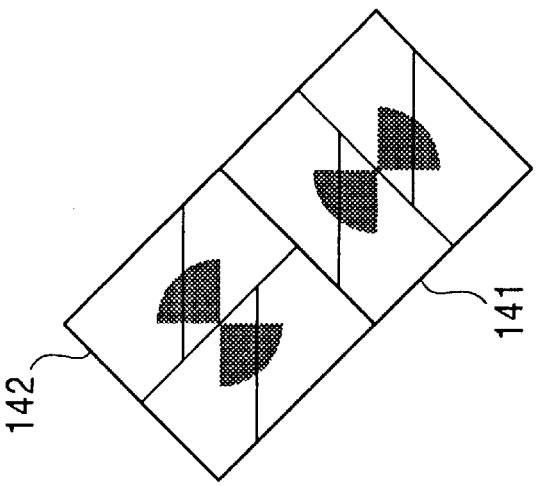
Figure 14A:
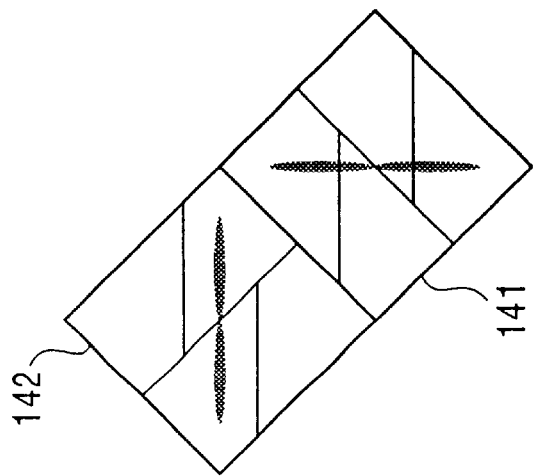

FIG. 14A is a diagram showing states of the return light spots in the first detector 141 and second detector 142 in the case where the emission light from the optical pickup 100 is in an out-of-focus state on the information recording surface of the optical disc and the optical disc is located at a position that is farther than that in the in-focus state.

As shown at the lower stage in FIG. 14A, when the optical disc is located at a position that is farther than that in the in-focus state, the light to which the first astigmatism has been applied by the first quadrant region of the lens device 180 enters as a light spot of a line segment shape extending in the vertical direction on the first photosensing portions A1 and A2 of the first detector 141, and the light to which the first astigmatism has been applied by the third quadrant region of the lens device 180 enters as a light spot of a line segment shape extending in the vertical direction on the first photosensing portions A3 and A4 of the first detector 141.

In this case, the two line-segment-shaped light spots on the first detector 141 have the same shape and size (area). The dividing lines 62 and 63 almost uniformly divide each line-segment-shaped light spot. When the optical disc is located at a position that is farther than that in the in-focus state, therefore, in the first detector 141, the following equation (18)

$$A1=A2=A3=A4=k \tag{18}$$

where, k is an arbitrary real number value is satisfied.

As shown at the upper stage in FIG. 14A, when the optical disc is located at a position that is farther than that in the in-focus state, the light to which the second astigmatism has been applied by the second quadrant region of the lens device 180 enters as a light spot of a line segment shape extending in the horizontal direction on the second photosensing portion B2 of the second detector 142, and the light to which the second astigmatism has been applied by the fourth quadrant region of the lens device 180 enters as a line-segment-shaped light spot extending in the horizontal direction of the second detector 142.

In this case, the photodetection electric signal B1 which is generated by the second photosensing portion B1 and the photodetection electric signal B3 which is generated by the second photosensing portion B3 are equal and can be regarded to be zero. When the optical disc is located at a position that is farther than that in the in-focus state, in the second detector 142, the following equation (19)

$$B2=B4=2k \tag{19}$$

and the following equation (20)

$$B1=B3=0 \tag{20}$$

are satisfied.

From those equations, by substituting the above conditional equations (18), (19), and (20) for the equation (17), FE1 as an FE value in this case is obtained by the following equation (21).

$$FE1=(A1+A3+B2+B4)-(A2+A4+B1+B3)=(k+k+2k+2k)-(k+k+0+0)=4k \tag{21}$$

When the optical disc is located at a position that is farther than that in the in-focus state, the value of FE is set to a positive value.

FIG. 14C is a diagram showing states of the return light spots in the first detector 141 and second detector 142 in the case where the emission light from the optical pickup 100 is in an out-of-focus state on the information recording surface of the optical disc and the optical disc is located at a position that is nearer than that in the in-focus state.

As shown at the lower stage in FIG. 14C, when the optical disc is located at a position that is nearer than that in the in-focus state, the light to which the first astigmatism has been applied by the first quadrant region of the lens device 180 enters as a light spot of a line segment shape extending in the horizontal direction on the first photosensing portion A2 of the first detector 141, and the light to which the first astigmatism has been applied by the third quadrant region of the lens device 180 enters as a line-segment-shaped light spot extending in the horizontal direction on the first photosensing portion A4 of the first detector 141.

In this case, the photodetection electric signal A1 which is generated by the first photosensing portion A1 and the photodetection electric signal A3 which is generated by the first photosensing portion A3 are equal and can be regarded to be zero. When the optical disc is located at a position that is nearer than that in the in-focus state, therefore, in the first detector 141, the following equation (22)

$$A2=A4=2k \tag{22}$$

where, k is an arbitrary real number value and the following equation (23)

$$A1=A3=0 \tag{23}$$

are satisfied.

As shown at the upper stage in FIG. 14C., when the optical disc is located at a position that is nearer than that in the in-focus state, the light to which the second astigmatism has been applied by the second quadrant region of the lens device 180 enters as a light spot of a line segment shape extending in the vertical direction on the second photosensing portions B2 and B3 of the second detector 142, and the light to which the second astigmatism has been applied by the fourth quadrant region of the lens device 180 enters as a line-segment-shaped light spot extending in the vertical direction on the second photosensing portions B4 and B1 of the second detector 142.

In this case, the two line-segment-shaped light spots on the second detector 142 have the same shape and size (area). The dividing lines 65 and 66 almost uniformly divide the line-segment shaped light spots. When the optical disc is located at a position that is nearer than that in the in-focus state, therefore, in the second detector 142, the following equation (24) is satisfied.

$$B1=B2=B3=B4=k \tag{24}$$

By substituting the conditional equations (22), (23), and (24) into the equation (17), consequently, FE2 as an FE value in this case is obtained by the following equation (11).

$$FE1=(A1+A3+B2+B4)-(A2+A4+B1+B3) =(0+0+k+k)-(2k+2k+k)=-4k \tag{25}$$

When the optical disc is located at a position that is nearer than that in the in-focus state, the FE value becomes a negative value.

If the value of FE expressed by the equation (17) is used as a focusing error signal, therefore, it is possible to determine such that when the FE value is equal to zero, the in-focus state is obtained, when the FE value is equal to a positive value, the optical disc is located at a position that is farther than that in the in-focus state, and when the FE value is equal to a negative value, the optical disc is located at a position that is nearer than that in the in-focus state. By feeding back the electric signal obtained by inverting the positive/negative sign of the focusing error signal FE and controlling the objective lens driving mechanism (not shown) provided for the objective lens 7 of the optical pickup 100 so as to set the FE value to zero, therefore, a focusing servo control can be certainly performed. In this case, an arithmetic operating circuit (not shown) connected to the output side of the photodetecting portion 190 corresponds to the focus error discrimination value operating means, and the focusing error signal value of FE corresponds to the focus error discrimination value.

By calculating a value of RF expressed by the following equation (26)

$$RF=A1+A2+A3+A4+B1+B2+B3+B4 \tag{26}$$

by using the outputs of the first detector 141 and second detector 142, the optical disc recording information recorded on the optical disc can be read out from the RF signal.

By calculating values of DPD1, DPD2, DPD3, and DPD4 expressed by the following equations (27), (28), (29), and (30)

$$DPD1=B1+B4 \tag{27}$$

$$DPD2=B2+B3 \tag{28}$$

$$DPD3=A1+A2 \tag{29}$$

$$DPD4=A3+A4 \tag{30}$$

a tracking servo control of the DPD system can be performed by these signals.

By calculating a value PP expressed by the following equation (31)

$$PP=(A1+A2+B2+B3)-(A3+A4+B1+B4) \tag{31}$$

a tracking servo control by the Push-Pull method can be performed.

Figure 15:
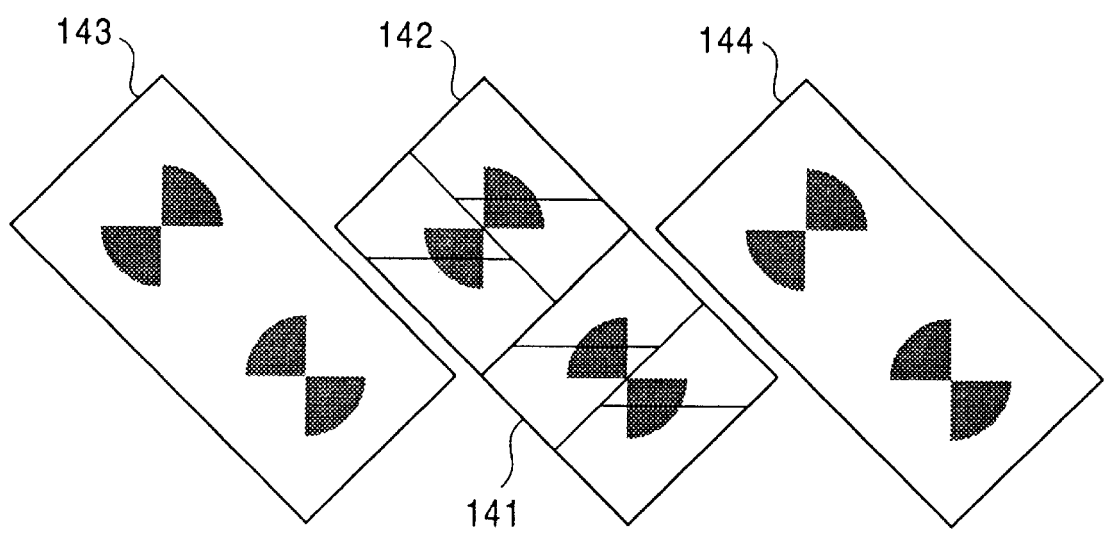
FIG. 15 is a diagram showing a construction of a photodetecting portion in the optical pickup in an embodiment of the invention.

The third detector 143 and fourth detector 144 are arranged on both sides of the first detector 141 and second detector 142 as shown in FIG. 15, either the third and fourth detector is used for a + primary subbeam, and the other is used for a − primary subbeam, thereby making it possible to also cope with the 3-beam system. In this case, the third detector 143 corresponds to the third photodetector and the fourth detector 144 corresponds to the fourth photodetector.

The focus error detecting method in the optical pickup 100 has the following advantages.

(1) As will be understood from FIG. 13, among the return light, the light on the first quadrant region is divided by the first photosensing portions A1 and A2, the light on the second quadrant region is divided by the second photosensing portions B2 and B3, the light on the third quadrant region is divided by the first photosensing portions A3 and A4, and the light on the fourth quadrant region is divided by the second photosensing portions B4 and B1, respectively. On the detector, therefore, interference of the return light on the detector does not occur between the quadrants. Even if the thickness of optical disc is not constant and there is a thickness error depending on the location, therefore, a leakage of the light between the quadrant or the like does not occur and no error occurs in the DPD tracking error signal.

(2) Since a separation degree of the laser beam for every quadrant on the detector is raised, a situation that the DPD tracking error signal is deteriorated due to the optical axial deviation of the detector or the like can be prevented to a certainly extent.

(3) Since the detector is divided into four portions by the lightning-shaped dividing lines, the influence on the focusing error signal by the track transversal noises can be almost cancelled.

(4) In FIG. 13, the X-axial direction corresponds to the radial direction of the disc and the Y-axial direction corresponds to the track tangential direction of the disc. When the detector causes an optical axial deviation or an adjustment deviation in the radial direction (X direction), therefore, the light images, on the detector are moved along the dividing lines 62, 63, 65, and 66, so that an influence is small.

(5) The common use with the 3-beam system can be also performed without causing any trouble.

In the optical pickup 100, the lens device 180, first detector 141, second detector 142, and arithmetic operating circuit (not shown) construct the focus error detecting apparatus.

The invention is not limited to the embodiments. The embodiments are shown as examples and all modifications having substantially the same construction as that of the technical idea disclosed in the scope of claims for a patent of the present invention and having operations and effects similar to those of the invention are incorporated in the technical scope of the invention.

For example, although the embodiments have been described with respect to the lens device 180 constructed by combining the eccentric cylindrical lenses as an example of the focus error detecting optical device, the invention is not limited to these examples. A focus error detecting optical device of another construction, for example, the first hologram device or the like can be used. In brief, a focus error detecting optical device having any construction can be used so long as it is constructed in a manner such that the light existing in the first and third quadrant regions on the plane that is perpendicular to the optical axis of the return light is separated to the first optical path, the light existing in the second and fourth quadrant regions on the plane that is perpendicular to the optical axis is separated to the second optical path, a first astigmatism is applied to the light on the first optical path to thereby form the first processing light, and a second astigmatism in the direction that is inclined by 90° for the direction of the first astigmatism is applied to the light on the second optical path to thereby form the second processing light.

As shown in FIGS. 11A and 11B, although the lens device 180 is arranged in front of the photodetecting portion 190 in the first embodiment, an eccentric lens device having a function similar to that of the lens device 180 and having a polarizing operation can be arranged between the mirror 5 and ¼ wavelength plate 6.

The first detector 141 and second detector 142 shown in FIG. 13 can also have another construction. For example, the dividing lines 62 and 63 can be made close to or away from each other by the same length. In this instance, the dividing lines 65 and 66 are also similarly made close to or away from each other, or the first dividing angle è1 defined by the dividing lines 62 and 63 can be increased or decreased by the same angle. In this case, a balance state of the dividing lines 62 and 63 is always held. At this time, the second dividing angle 62 defined by the dividing lines 65 and 66 is also similarly increased or decreased by the same angle.

As described above, according to the invention, the return light from the optical disc is divided into two optical paths, a predetermined astigmatism is applied to the light of each divided optical path, and two photodetectors each having the photosensing portions divided into four portions by the lightning-shaped dividing lines are used. There are, consequently, advantages such that the signal is not easily influenced by the track transversal noises or optical disc thickness error, the 3-beam system and the DPD system can be used in common, the sensitivity of the out-of-focus state detection is high, and the optical pickup can be also miniaturized.

Figure 16:
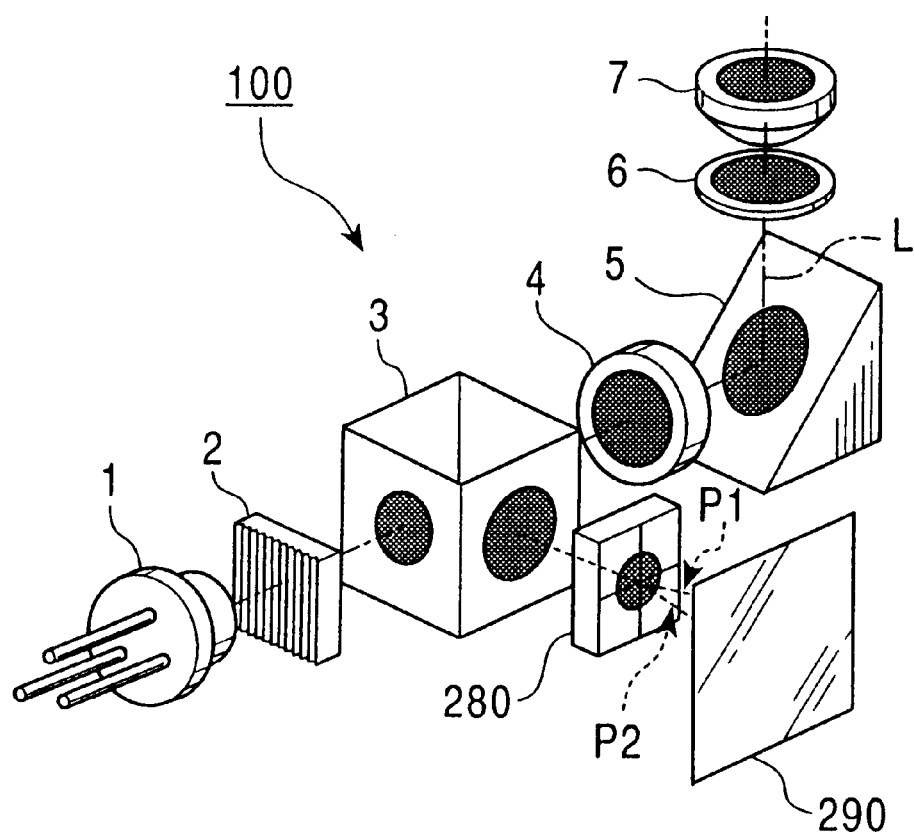
FIG. 16 is a diagram showing a construction of an optical pickup according to another embodiment of the invention.

FIG. 16 is a diagram showing a construction of an optical pickup according to another embodiment of the invention.

As shown in FIG. 16, the optical pickup 100 comprises: the semiconductor laser 1 as a light source; the grating 2; the beam splitter 3: the collimator lens 4; the mirror 5; the ¼ wavelength plate 6; the objective lens 7; a hologram device 280; and a photodetecting portion 290. An objective lens driving mechanism (not shown) which can move the objective lens 7 forward and backward in the optical axial direction is provided for the objective lens 7.

The photodetecting portion 290 has a first detector 211 and a second detector 212 (refer to FIGS. 19A and 19B), which will be explained hereinlater. An arithmetic operating circuit (not shown) comprising an adder and a subtractor for performing predetermined arithmetic operations on the basis of photodetection electric signals generated from the first and second detectors is connected to the photodetecting portion 290.

The laser beam L emitted from the semiconductor laser 1 enters the beam splitter 3 through the grating 2. The beam splitter 3 has a half mirror (semi-transparent mirror). The incident laser beam L passes through the beam splitter 3 and is transmitted through the collimator lens 4. An optical path of the laser beam is turned by a right angle by the mirror 5 and, thereafter, the laser beam passes through the ¼ wavelength plate 6 and is irradiated from the objective lens 7 onto the information recording surface of an optical disc (not shown) locating at an upper position in the diagram. Optical disc recording information can be written to the information recording surface of the optical disc by the irradiation light.

The laser beam L is reflected by the information recording surface of the optical disc, returned along the same optical path, transmitted through the objective lens 7, ¼ wavelength plate 6, mirror 5, and collimator lens 4, and enters the beam splitter 3 again. In this case, the optical path of the return light is changed in the direction different from the direction toward the semiconductor laser 1 by the beam splitter 3. After that, the laser beam passes through the hologram device 280 and enters the photodetecting portion 290. The photodetecting portion 290 photoelectrically converts the received light and generates a photodetection electric signal. The optical disc recording information can be read out from the photodetection electric signal.

A focus error detecting method in the optical pickup 100 will now be described. In the optical pickup 100, the return light separated by the beam splitter 3 is divided into the first optical path P1 and the second optical path P2 by the hologram device 280, the return light on the first optical path P1 is received by the first detector 211 (refer to FIGS. 19A and 19B), which will be explained hereinlater, the return light on the second optical path P2 is received by the second detector 212 (FIGS. 19A and 19B), which will be explained hereinlater, and predetermined arithmetic operations are performed to the photodetection electric signal generated by the photoelectric conversion, thereby generating a focusing error signal.

A construction of the hologram device 280 will now be described. The hologram device 280 has a first hologram portion 215, a second hologram portion 216, and a third hologram portion 219. FIGS. 17A to 17D are diagrams for explaining constructions of the first hologram portion 215 and second hologram portion 216 in the hologram device 280 in the optical pickup 100. FIG. 18 is a diagram for explaining a construction of the third hologram portion 219 in the hologram device 280 in the optical pickup 100.

Figure 17A:
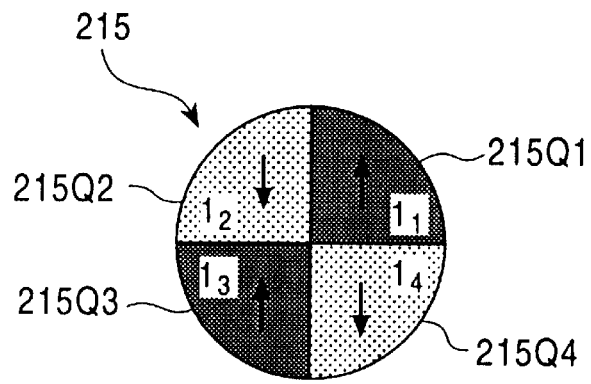
FIGS. 17A to 17D are diagrams for explaining a construction of a hologram device in the optical pickup according to the other embodiment of the invention.
Figure 18:
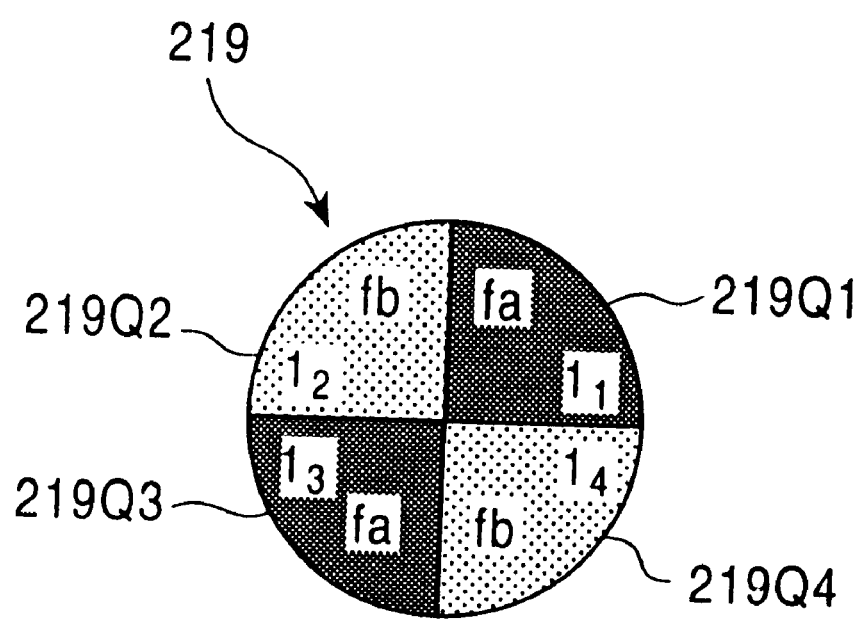
FIG. 18 is a diagram for explaining a construction of the hologram device in the optical pickup according to the other embodiment of the invention.

As shown in FIG. 17A, the first hologram portion 215 has a function that is equivalent to a prism for separating the light existing in a first quadrant region 215Q1 and a third quadrant region 215Q3 on the plane that is perpendicular to the optical axis of the return light to the first optical path (shown in the upward direction in FIG. 17A). The first hologram portion 215 also has a function that is equivalent to a prism for separating the light existing in a second quadrant region 215Q2 and a fourth quadrant region 215Q4 on the plane that is perpendicular to the optical axis of the return light to the second optical path (shown in the downward direction in FIG. 17A). In this case, the first hologram portion 215 corresponds to optical path separating means.

Figure 17B:
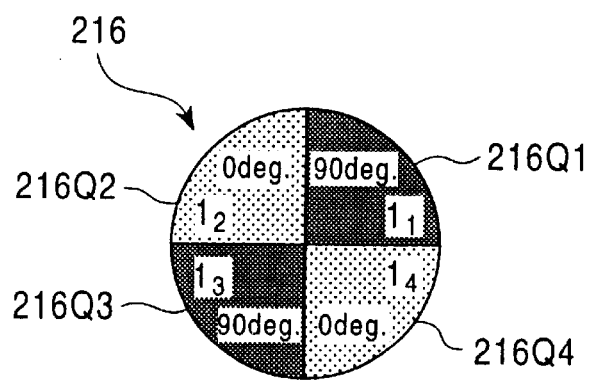
Figure 17C:
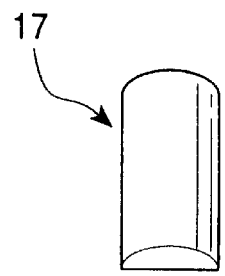

In the second hologram portion 216 shown in FIG. 17B, a first quadrant region 216Q1 and a third quadrant region 216Q3 apply a first astigmatism to the light on the first optical path to thereby obtain first processing light. This function is equivalent to, for example, an optical device in which the cylindrical lens 17 shown in FIG. 17C is arranged in the first quadrant region 216Q1 and third quadrant region 216Q3.

Figure 17D:
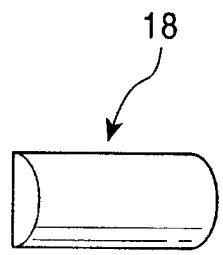

In the second hologram portion 216, a second quadrant region 216Q2 and a fourth quadrant region 216Q4 apply a second astigmatism to the light on the second optical path to thereby obtain second processing light. The second astigmatism is set to the direction that is inclined by 90° for the direction of the first astigmatism as indicated by "90 deg." and "0 deg." respectively in FIG. 17B. This function is equivalent to, for example, an optical device in which the cylindrical lens 18 shown in FIG. 17D is arranged in the second quadrant region 216Q2 and fourth quadrant region 216Q4. That is, a major axis (axis in the horizontal direction in FIG. 17D) of the cylindrical lens 18 is inclined by 90° for a major axis (axis in the vertical direction in FIG. 17C) of the cylindrical lens 17. The second hologram portion 216 corresponds to first optical processing means.

In the third hologram portion 219 shown in FIG. 18, a first quadrant region 219Q1 and a third quadrant region 219Q3 apply a first focal point "fa" to the first processing light to thereby obtain third processing light. In the third hologram portion 219, a second quadrant region 219Q2 and a fourth quadrant region 219Q4 apply a second focal point "fb" to the second processing light to thereby obtain fourth processing light. The third hologram portion 219 corresponds to second optical processing means. The hologram device 280 corresponds to a focus error detecting optical device.

The first quadrant region denotes a region in which when a plane is divided into four regions by the X axis in the horizontal direction and the Y axis in the vertical direction that is perpendicular to the X axis, both the X coordinate and the Y coordinate are set to positive values. The second quadrant region is a region adjacent to the first quadrant region among the four regions, the X coordinate is set to a negative value, and the Y coordinate is set to a positive value. The third quadrant region is a region adjacent to the second quadrant region among the four regions and both the X coordinate and the Y coordinate are set to negative values. The fourth quadrant region is a region adjacent to the first and third quadrant regions among the four regions, the X coordinate is set to a positive value, and the Y coordinate is set to a negative value.

Constructions and the operations of the first and second detectors in the optical pickup 100 will now be described with reference to FIGS. 19A and 19B.

Figure 19A:
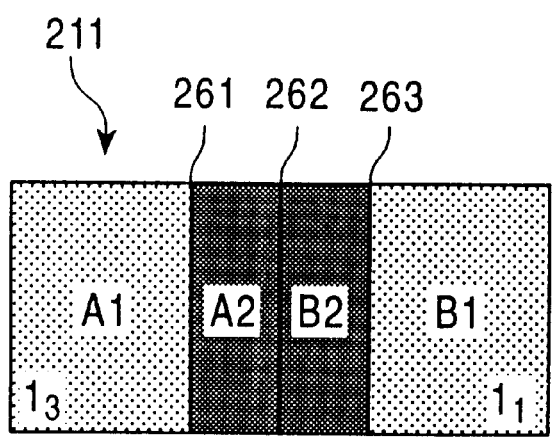
FIGS. 19A and 19B are diagrams for explaining constructions and the operations of a first detector and a second detector in the optical pickup according to the other embodiment of the invention.

As shown in FIG. 19A, the first detector 211 has rectangular photosensing regions and has four first photosensing portions A1, A2, B1, and B2. Photosensing portion boundary lines 261, 262, and 263 to partition the four first photosensing portion A1 and the like are straight lines which are parallel with a Y-axial direction line (vertical direction line) among quadrant partition lines of the first to fourth quadrant regions (215Q1 to 215Q4), (216Q1 to 216Q4), or (219Q1 to 219Q4). In the first photosensing portions A1, A2, B1, and B2, the whole photosensing region is divided into four regions by the parallel lines and they have the rectangular shapes, respectively.

The light on the first optical path P1 emitted from the hologram device 280 (third processing light to which the first focal point has been applied by the first quadrant region 219Q1 and third quadrant region 219Q3 of the third hologram portion 219) enters the first detector 211. In the third processing light, the light $l_1$ emitted from the first quadrant region 219Q1 of the third hologram portion 219 enters so as to extend over the first photosensing portions B1 and B2. In the third processing light, the light $l_3$ emitted from the third quadrant region 219Q3 of the third hologram portion 219 enters so as to extend over the first photosensing portions A1 and A2. The first detector 211 corresponds to the first photodetector.

Figure 19B:
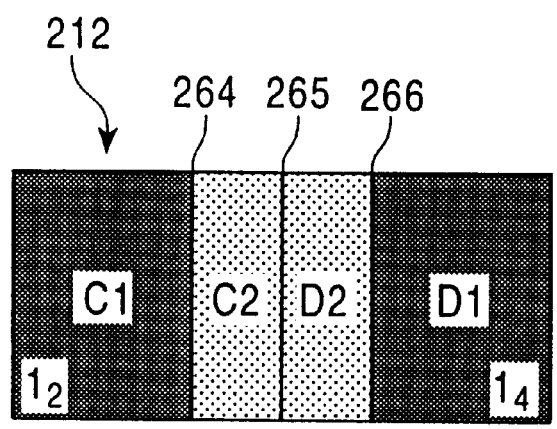

As shown in FIG. 19B, the second detector 212 has rectangular photosensing regions and has four second photosensing portions C1, C2, D1, and D2. Photosensing portion boundary lines 264, 265, and 266 to partition the four second photosensing portion C1 and the like are straight lines which are parallel with a Y-axial direction line (vertical direction line) among quadrant partition lines of the first to fourth quadrant regions (215Q1 to 215Q4), (216Q1 to 216Q4), or (219Q1 to 219Q4). In the second photosensing portions C1, C2, D1, and D2, the whole photosensing region is divided into four regions by the parallel lines and they have the rectangular shapes, respectively.

The light on the second optical path P2 emitted from the hologram device 280 (fourth processing light to which the second focal point has been applied by the second quadrant region 219Q2 and fourth quadrant region 219Q4 of the third hologram portion 219) enters the second detector 212. In the fourth processing light, the light $l_2$ emitted from the second quadrant region 219Q2 of the third hologram portion 219 enters so as to extend over the second photosensing portions C1 and C2. In the fourth processing light, the light $l_4$ emitted from the fourth quadrant region 219Q4 of the third hologram portion 219 enters so as to extend over the second photosensing portions D1 and D2. The second detector 212 corresponds to the second photodetector.

The operation when the focal position in the optical pickup 100 is changed will now be described with reference to FIGS. 20A to 20C. FIG. 20B is a diagram showing states of the return light spots in the first detector 211 and second detector 212 in the case where the light emitted from the optical pickup 100 is in the in-focus state on the information recording surface of the optical disc.

As shown at the upper stage in FIG. 20B, in the in-focus state, the first processing light $l_1$ from the first quadrant region of the hologram device 280 enters the first photosensing portions B1 and B2 of the first detector 211 as a line-shaped light spot, and the third processing light $l_3$ from the third quadrant region of the hologram device 280 enters the first photosensing portions A1 and A2 of the first detector 211 as a line-shaped light spot.

As shown at the lower stage in FIG. 20B, in the in-focus state, the second processing light $l_2$ from the second quadrant region of the hologram device 280 enters the second photosensing portions C1 and C2 of the first detector 211 as a line-shaped light spot, and the fourth processing light $l_4$ from the fourth quadrant region of the hologram device 280 enters the second photosensing portions D1 and D2 of the second detector 212 as a line-shaped light spot.

In this case, in the in-focus state, the photodetection electric signal A1 which is generated by the first photosensing portion A1, the photodetection electric signal B1 which is generated by the first photosensing portion B1, the photodetection electric signal C1 which is generated by the second photosensing portion C1, and the photodetection electric signal D1 which is generated by the second photosensing portion D1 are equal, respectively. In the in-focus state, the photodetection electric signal A2 which is generated by the first photosensing portion A2, the photodetection electric signal B2 which is generated by the first photosensing portion B2, the photodetection electric signal C2 which is generated by the second photosensing portion C2, and the photodetection electric signal D2 which is generated by the second photosensing portion D2 are equal, respectively.

The following equation (32)

$$A1=B1=C1=D1 \qquad (32)$$

and the following equation (33)

$$A2=B2=C2=D2 \qquad (33)$$

are, therefore, satisfied.

From these equations, if the value of FE expressed by the following equation (34)

$$FE=(A2+B2+C1+D1)-(A1+B1+C2+D2) \qquad (34)$$

is calculated by an arithmetic operating circuit (not shown) connected to the output side of the photodetecting portion 290, the value of FE is set to zero in the in-focus state.

Figure 20C:
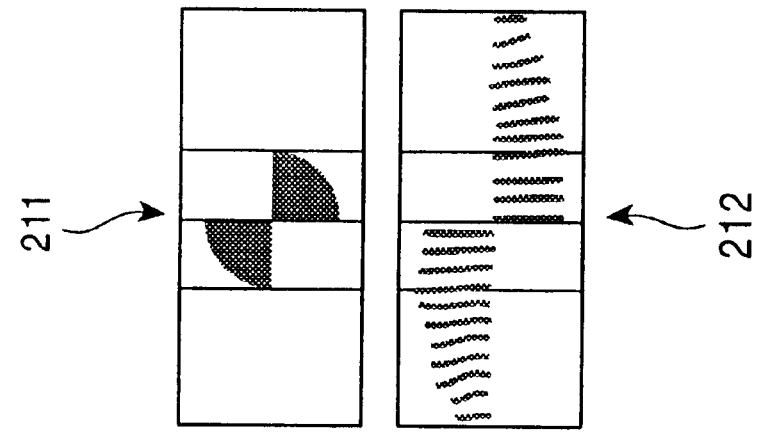
FIGS. 20A to 20C are diagrams for explaining the operation when the focal position is changed in the optical pickup according to the other embodiment of the invention.
Figure 20B:
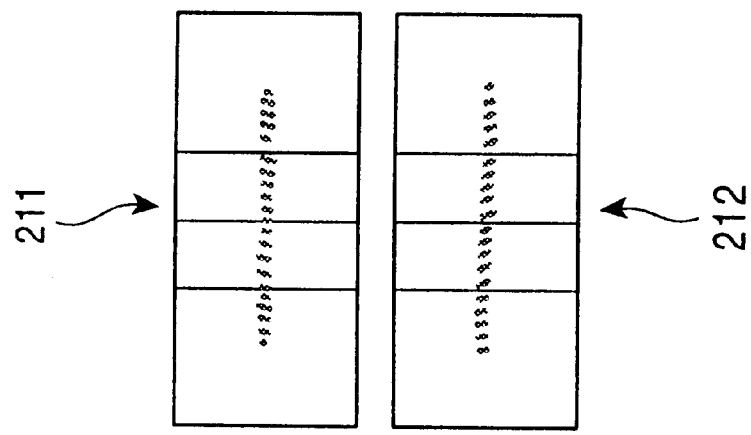
Figure 20A:
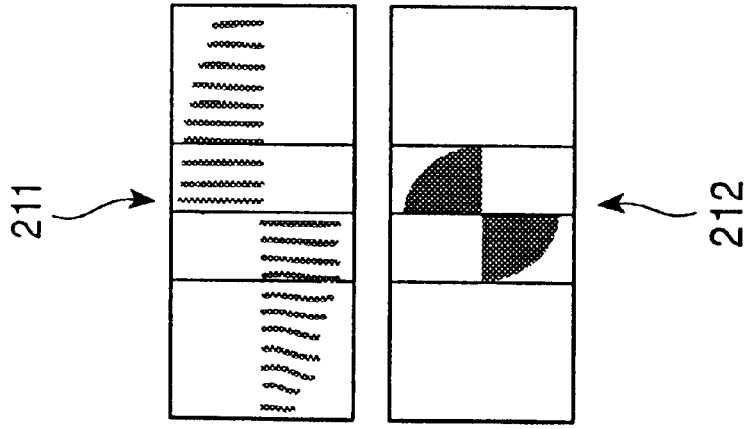

FIG. 20A is a diagram showing states of the return light spots in the first detector 211 and second detector 212 in the case where the light emitted from the optical pickup 100 is in the out-of-focus state on the information recording surface of the optical disc and the optical disc is located at a position that is nearer than that in the in-focus state.

As shown at the upper stage in FIG. 20A, when the optical disc is located at a position that is nearer than that in the in-focus state, the first processing light $l_1$ from the first quadrant region of the hologram device 280 enters the first photosensing portions B1 and B2 of the first detector 211 as a light spot of a quarter shape of an ellipse, and the third processing light $l_3$ from the third quadrant region of the hologram device 280 enters the first photosensing portions A1 and A2 of the first detector 211 as a light spot of a quarter shape of an ellipse.

In this case, the two light spots of the ¼-elliptic shape on the first detector 211 have the same shape and size (area). A ratio (B1:B2) between the photodetection electric signal B1 that is generated from the first photosensing portion B1 and the photodetection electric signal B2 that is generated from the first photosensing portion B2 is set to, for example, (6:4). This ratio is also similarly applied to the case of A1 and A2. When the optical disc is located at a position that is nearer than that in the in-focus state, therefore, in the first detector 211, therefore, the following equations (35) and (36) are satisfied.

$$A1=B1=6k \qquad (35)$$

$$A2=B2=4k \qquad (36)$$

where, k is an arbitrary positive number value

As shown at the lower stage in FIG. 20A, when the optical disc is located at a position that is nearer than that in the in-focus state, the second processing light $l_2$ from the second quadrant region of the hologram device 280 enters the second photosensing portion C2 of the second detector 212 as a light spot of a quarter shape of an ellipse and does not enter the second photosensing portion C1 of the second detector 212, and the fourth processing light $l_4$ from the fourth quadrant region of the hologram device 280 enters the second photosensing portion D2 of the second detector 212 as a light spot of a quarter shape of an ellipse and does not enter the second photosensing portion D1 of the second detector 212.

In this case, the photodetection electric signal C1 that is generated from the second photosensing portion C1 and the photodetection electric signal D1 that is generated from the second photosensing portion D1 are equal and can be regarded to be zero. When the optical disc is located at a position that is farther than that in the in-focus state, therefore, in the second detector 212, the following equations (37) and (38) are satisfied.

$$C2=D2=10k \qquad (37)$$

$$C1=D1=0 \qquad (38)$$

From these equations, by substituting the conditional equations (35), (36), (37.), and (38) into the equation (34), FE1 as an FE value in this case is obtained by the following equation (39).

$$FE1=(A2+B2+C1+D1)-(A1+B1+C2+D2) =(4k+4k)-(6k+6k+10k+10k)=-24k \qquad (39)$$

When the optical disc is located at a position that is nearer than that in the in-focus state, the value of FE is set to a negative value.

FIG. 20C is a diagram showing states of the return light spots in the first detector 211 and second detector 212 in the case where the light emitted from the optical pickup 100 is in the out-of-focus state on the information recording surface of the optical disc and the optical disc is located at a position that is farther than that in the in-focus state.

As shown at the upper stage in FIG. 20C, when the optical disc is located at a position that is farther than that in the in-focus state, the first processing light $l_1$ from the first quadrant region of the hologram device 280 enters the first photosensing portion B2 of the first detector 211 as a light spot of a quarter shape of an ellipse and does not enter the first photosensing portion B1 of the first detector 211, and the third processing light $l_3$ from the third quadrant region of the hologram device 280 enters the first photosensing portion A2 of the first detector 211 as a light spot of a quarter shape of an ellipse and does not enter the first photosensing portion B1 of the first detector 211.

In this case, the photodetection electric signal B1 that is generated from the first photosensing portion B1 and the photodetection electric signal A1 that is generated from the first photosensing portion A1 are equal and can be regarded to be zero. When the optical disc is located at a position that is farther than that in the in-focus state, therefore, in the second detector 212, the following equations (40) and (41) are satisfied.

$$A2=B2=10k \qquad (40)$$

$$A1=B1=0 \qquad (41)$$

As shown at the lower stage in FIG. 20C, when the optical disc is located at a position that is farther than that in the in-focus state, the second processing light $l_2$ from the second quadrant region of the hologram device 280 enters the second photosensing portions C1 and C2 of the second detector 212 as a light spot of a quarter shape of an ellipse, and the fourth processing light $l_4$ from the fourth quadrant region of the hologram device 280 enters the second photosensing portions D1 and D2 of the second detector 212 as a light spot of a quarter shape of an ellipse.

In this case, the two light spots of the ¼-elliptic shape on the second detector 212 have the same shape and size (area). A ratio (C1:C2) between the photodetection electric signal C1 that is generated from the second photosensing portion C1 and the photodetection electric signal C2 that is generated from the second photosensing portion C2 is set to, for example, (6:4). This ratio is also similarly applied to the case of D1 and D2. When the optical disc is located at a position that is farther than that in the in-focus state, therefore, in the second detector 212, the following equations (42) and (43) are satisfied.

$$C1=D1=6k \tag{42}$$

$$C2=D2=4k \tag{43}$$

From these equations, by substituting the conditional equations (40) to (43) into the equation (34), FE2 as an FE value in this case is obtained by the following equation (44).

$$FE2=(A2+B2+C1+D1)-(A1+B1+C2+D2) =(10k+10k+6k+6k)-(4k+4k)=24k \tag{44}$$

When the optical disc is located at a position that is farther than that in the in-focus state, the value of FE becomes a positive value.

If the value of FE expressed by the equation (34) is used as a focusing error signal, therefore, it is possible to determine such that when the FE value is equal to zero, the in-focus state is obtained, when the FE value is equal to a negative value, the optical disc is located at a position that is nearer than that in the in-focus state, and when the FE value is equal to a positive value, the optical disc is located at a position that is farther than that in the in-focus state. By feeding back the electric signal obtained by inverting the positive/negative sign of the focusing error signal FE and controlling an objective lens driving mechanism (not shown) provided for the objective lens 7 of the optical pickup 100 so as to set the FE value to zero, therefore, a focusing servo control can be certainly performed. In this case, an arithmetic operating circuit (not shown) connected to the output side of the photodetecting portion 290 corresponds to the focus error discrimination value operating means, and the focusing error signal value of FE corresponds to the focus error discrimination value.

By calculating a value of RF expressed by the following equation (45)

$$RF=A1+A2+A3+A4+B1+B2+B3+B4 \tag{45}$$

by using the outputs of the first detector 211 and second detector 212, the optical disc recording information recorded on the optical disc can be read out from the RF signal.

By calculating values of DPD1, DPD2, DPD3, and DPD4 expressed by the following equations (46), (47), (48), and (49)

$$DPD1=A1+A2 \tag{46}$$

$$DPD2=B1+B2 \tag{47}$$

$$DPD3=C1+C2 \tag{48}$$

$$DPD4=D1+D2 \tag{49}$$

a tracking servo control of the DPD system can be performed by these signals.

By calculating a value PP expressed by the following equation (50)

$$PP=(A1+A2+C1+C2)-(B1+B2+D1+D2) \tag{50}$$

a tracking servo control by the Push-Pull method can be performed.

Although not shown, the third detector and the fourth detector are arranged on both sides of the first detector 211 and second detector 212, either the third or fourth detector is used for a + primary subbeam, and the other is used for a primary subbeam, thereby making it possible to also cope with the 3-beam system. In this case, the third detector corresponds to the third photodetector and the fourth detector corresponds to the fourth photodetector.

The focus error detecting method in the optical pickup 100 has the following advantages.

(1) Interference of the return light on the detector does not occur between the quadrants. Even if the thickness of optical disc is not constant and there is a thickness error in dependence on a location, there is no leakage of the light between the quadrants, or the like.

(2) A leakage of a track transversal signal is small.

(3) The detecting system is compact and it is also possible to use it together with the 3-beam system without any trouble.

(4) The DPD tracking error can be detected.

In the optical pickup 100, the hologram device 280, first detector 211, second detector 212, and arithmetic operating circuit (not shown) construct the focus error detecting apparatus.

The invention is not limited to the above embodiments. The embodiments are shown as examples and have substantially the same construction as that of the technical idea disclosed in the scope of claims for a patent of the present invention and all modifications having operations and effects similar to those of the invention are incorporated in the technical scope of the invention.

For example, although the embodiments have been described with respect to the hologram device 280 as an example of the focus error detecting optical device, the invention is not limited to this example. A focus error detecting optical device of another construction, for example, an optical device constructed by combining a prism, a convex lens, and the like can be used. In brief, the focus error detecting optical device with any construction can be used so long as it has: optical path separating means for separating the light existing in the first and third quadrant regions on the plane that is perpendicular to the optical axis of the return light to the first optical path and separating the light existing in the second and fourth quadrant regions on the plane that is perpendicular to the optical axis to the second optical path; first optical processing means for applying the first astigmatism to the light on the first optical path to thereby form the first processing light and applying the second astigmatism in the direction that is inclined by 90° for the first astigmatism to the light on the second optical path to thereby form the second processing light: and second optical processing means for applying the first focal point to the first processing light to thereby form the third processing light and applying the second focal point to the second processing light to thereby form the fourth processing light.

Although the hologram device 280 is arranged in front of the photodetecting portion 290 as shown in FIG. 16 in the embodiment, a polarization lens device having a function similar to that of the hologram device 280 and having the eccentric function can be also arranged between the mirror 5 and ¼ wavelength plate 6.

As described above, according to the invention, since the return light from the optical disc is divided into two optical paths and a predetermined astigmatism is applied to the light of each divided optical path and a predetermined focal point is applied, there are advantages such that the system is not easily influenced by the track transversal noises and optical disc thickness error, the invention can be used in common together with the 3-beam system and DPD system, the sensitivity of the out-of-focus detection is high, and the optical pickup can be miniaturized.

What is claimed is:

1. A focus error detecting apparatus of an optical pickup, for detecting a focus error of an emission light in the optical pickup for writing optical disc recording information onto an information recording surface of an optical disc by said emission light emitted from a light source or reading out said optical disc recording information from return light which is emitted from said light source and reflected and returned by said information recording surface of said optical disc, comprising:

an integrated lens device constituted by a plurality of eccentric cylindrical lenses, which separates the light existing in a first quadrant region and a third quadrant region on a plane that is perpendicular to an optical axis of said return light to a optical path, separates the light existing in a second quadrant region and a fourth quadrant region on the plane that is perpendicular to said optical axis to a second optical path, applies a first astigmatism to the light on said first optical path to thereby obtain first processing light, and applies a second astigmatism in a direction that is inclined by 90° for said first astigmatism to the light on said second optical path to thereby obtain second processing light;

a first photodetector having four trapezoidal first photosensing portions formed by dividing a photosensing area into four portions by lightning-shaped dividing lines and for receiving and detecting said first processing light;

a second photodetector having other four trapezoidal second photosensing portions formed by dividing a photosensing area into four portions by other lightning-shaped dividing lines and for receiving and detecting said second processing light; and focus error discrimination value operating means for performing predetermined arithmetic operations to an intensity of each light received by the four portions of said first photosensing portions and an intensity of each light received by the four portions of said second photosensing portions and generating a focus error discrimination value.

2. An apparatus according to claim 1, wherein said integrated lens device has:

an eccentric cylindrical lens which is arranged in each of said first quadrant region and said third quadrant region on the plane that is perpendicular to said optical axis and sets a first direction to a major axis; and an eccentric cylindrical lens which is arranged in each of said second quadrant region and said fourth quadrant region on the plane that is perpendicular to said optical axis and sets a direction that is inclined by 90° for said first direction to a major axis.

3. An apparatus according to claim 1, wherein the photosensing area of said first photodetector is formed in a first square shape that is inclined by 45° and divided by a first uniform dividing line that is parallel with one side of said first square and equally divides said first square into two rectangles and two parallel dividing lines having a first dividing angle for said first uniform dividing line, and the photosensing area of said second photodetector is formed in a second square shape that is inclined by 45° and arranged so as to use one side in common with said first square and divided by a second uniform dividing line that is perpendicular to said first uniform dividing line and equally divides said second square into two rectangles and two parallel dividing lines having a second dividing angle for said second uniform dividing line.

4. An apparatus according to claim 1, wherein a third photodetector for a + primary subbeam and a fourth photodetector for a − primary subbeam are provided on the sides of said first photodetector and said second photodetector and a control by a 3-beam system is performed.

5. An apparatus according to claim 1, wherein a control by a Differential Phase Detection (DPD) system is performed.

6. A focus error detecting method of an optical pickup, for detecting a focus error of an emission light in the optical pickup for writing optical disc recording information onto an information recording surface of an optical disc by said emission light emitted from a light source or reading out said optical disc recording information from return light which is emitted from said light source and reflected and returned by said information recording surface of said optical disc, comprising the steps of:

providing a an integrated lens device constituted by a plurality of eccentric cylindrical lenses, which separates the light existing in a first quadrant region and a third quadrant region on a plane that is perpendicular to an optical axis of said return light to a first optical path, separates the light existing in a second quadrant region and a fourth quadrant region on the plane that is perpendicular to said optical axis to a second optical path, applies a first astigmatism to the light on said first optical path to thereby obtain first processing light, and applies a second astigmatism in a direction that is inclined by 90° for said first astigmatism to the light on said second optical path to thereby obtain second processing light, a first photodetector having four trapezoidal first photosensing portions formed by dividing a photosensing area into four portions by lightning-shaped dividing lines and for receiving and detecting said first processing light, and a second photodetector having other four trapezoidal second photosensing portions formed by dividing a photosensing area into four portions by other lightning-shaped dividing lines and for receiving and detecting said second processing light; and performing predetermined arithmetic operations to an intensity of each light received by the four portions of said first photosensing portions and an intensity of each light received by the four portions of said second photosensing portions and generating a focus error discrimination value.

* * * * *